US012651845B2

(12) United States Patent
Wang et al.

(10) Patent No.: US 12,651,845 B2
(45) Date of Patent: Jun. 9, 2026

(54) ELECTRONIC DEVICE WITH MILLIMETER WAVE ANTENNA MODULE

(71) Applicant: Honor Device Co., Ltd., Shenzhen (CN)

(72) Inventors: Yu Wang, Shenzhen (CN); Zengchao Qu, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 162 days.

(21) Appl. No.: 18/255,284

(22) PCT Filed: Aug. 24, 2022

(86) PCT No.: PCT/CN2022/114633

§ 371 (c)(1),
(2) Date: May 31, 2023

(87) PCT Pub. No.: WO2023/045688

PCT Pub. Date: Mar. 30, 2023

(65) Prior Publication Data

US 2024/0030619 A1 Jan. 25, 2024

(30) Foreign Application Priority Data

Sep. 24, 2021 (CN) .......................... 202111125698.6

(51) Int. Cl.
*H01Q 19/10* (2006.01)
*H01Q 1/24* (2006.01)

(52) U.S. Cl.
CPC ............. *H01Q 19/10* (2013.01); *H01Q 1/243* (2013.01)

(58) Field of Classification Search
CPC H01Q 1/24; H01Q 1/243; H01Q 1/22; H01Q 1/2291; H01Q 1/42; H01Q 3/32; H01Q 3/46; H01Q 15/0006; H01Q 15/0013; H01Q 15/0026; H01Q 19/06; H01Q 19/10; H01Q 21/08
See application file for complete search history.

(56) References Cited

U.S. PATENT DOCUMENTS

| | | | |
|---|---|---|---|
| 10,768,275 | B2 | 9/2020 | Kawaguchi et al. |
| 11,201,394 | B2 | 12/2021 | Jia et al. |

(Continued)

FOREIGN PATENT DOCUMENTS

| | | |
|---|---|---|
| CN | 106876972 A | 6/2017 |
| CN | 108539406 A | 9/2018 |

(Continued)

*Primary Examiner* — Thai Pham
(74) *Attorney, Agent, or Firm* — Conley Rose, P.C.

(57) ABSTRACT

An electronic device, including a circuit board, a back cover, and a millimeter wave antenna module. The millimeter wave antenna module is disposed on a surface of the circuit board facing the back cover and is configured to send a millimeter wave signal. At least one of the back cover and the circuit board is disposed with an in-phase reflection structure. According to this application, the phases of the millimeter wave signal reaching the back cover each time are the same when the millimeter wave signal is reflected the plurality of times between the circuit board and the back cover in a shorter distance. This reduces a thickness of the whole electronic device and improves radiation performance of an antenna.

19 Claims, 10 Drawing Sheets

(56) References Cited

U.S. PATENT DOCUMENTS

| | | | | |
|---|---|---|---|---|
| 2010/0328176 | A1* | 12/2010 | Lin | H01Q 19/06 343/834 |
| 2013/0002504 | A1* | 1/2013 | Lin | H01Q 19/06 343/834 |
| 2013/0222200 | A1 | 8/2013 | Ju et al. | |
| 2021/0036415 | A1* | 2/2021 | Jia | H01Q 15/0026 |
| 2021/0367357 | A1* | 11/2021 | Jia | H01Q 1/241 |
| 2021/0384645 | A1 | 12/2021 | Jia et al. | |
| 2021/0408683 | A1 | 12/2021 | Jia et al. | |
| 2022/0102855 | A1 | 3/2022 | Jia | |
| 2022/0216615 | A1 | 7/2022 | Jia | |
| 2024/0310477 | A1* | 9/2024 | Shiozaki | G01S 7/032 |

FOREIGN PATENT DOCUMENTS

| | | | | | |
|---|---|---|---|---|---|
| CN | 109075455 | A | | 12/2018 | |
| CN | 209298341 | U | | 8/2019 | |
| CN | 110729549 | A | | 1/2020 | |
| CN | 111146583 | A | * | 5/2020 | H01Q 1/48 |
| CN | 111725604 | A | | 9/2020 | |
| CN | 112234356 | A | | 1/2021 | |
| CN | 112310633 | A | | 2/2021 | |
| CN | 112701480 | A | | 4/2021 | |
| CN | 113937463 | A | | 1/2022 | |
| EP | 3772131 | A1 | | 2/2021 | |
| JP | 2014216751 | A | | 11/2014 | |
| WO | 2021078147 | A1 | | 4/2021 | |

* cited by examiner

0° beam: Gain: 11.70 db

30° beam: Gain: 10.90 db

45° beam: Gain: 9.804 db

ELECTRONIC DEVICE WITH MILLIMETER WAVE ANTENNA MODULE

CROSS-REFERENCE TO RELATED APPLICATIONS

This application is a U.S. National Stage of International Application No. PCT/CN2022/114633 filed on Aug. 24, 2022, which claims priority to Chinese Patent Application No. 202111125698.6, filed with the China National Intellectual Property Administration on Sep. 24, 2021, both of which are incorporated herein by reference in their entireties.

TECHNICAL FIELD

This application relates to the field of communication technologies, and in particular, to an electronic device with a millimeter wave antenna module.

BACKGROUND

As a component of transmitting and receiving an electromagnetic wave, an antenna is an important part of an electronic device. At present, with the development of 5G technology, a quantity of antennas required by the electronic device is increased. Some antennas are disposed on a circuit board of the electronic device. When the electronic device is assembled, an antenna disposed on the circuit board is blocked by a back cover, and the antenna needs to receive and send a millimeter wave signal through the back cover. Because of the back cover, the millimeter wave signal is reflected or suffers a loss to a certain extent. This results in large attenuation of the millimeter wave signal, and affects radiation performance of the antenna.

SUMMARY

Embodiments of this application provide an electronic device with a millimeter wave antenna module. The electronic device can improve radiation performance of an antenna and reduce a size of the electronic device.

According to a first aspect, an embodiment of this application provides an electronic device with a millimeter wave antenna module. The electronic device includes a circuit board, a back cover, and a millimeter wave antenna module. The millimeter wave antenna module is disposed on a surface of the circuit board facing the back cover and at least configured to send a millimeter wave signal. At least one of the back cover and the circuit board is disposed with an in-phase reflection structure, the in-phase reflection structure is used to reflect a received millimeter wave signal, and a phase of a millimeter wave signal received by the in-phase reflection structure is the same as that of a reflected millimeter wave signal. The millimeter wave signal sent by the millimeter wave antenna module is reflected a plurality of times between the circuit board and the back cover, and a distance between the circuit board and the back cover satisfies that phases of a millimeter wave signal reaching the back cover each time are the same.

Therefore, in this application, by setting a preset distance between the circuit board and the back cover, when the millimeter wave signal sent by the millimeter wave antenna module is reflected a plurality of times between the circuit board and the back cover, the phases of the millimeter wave signal reaching the back cover each time are the same. Because the millimeter wave signal reaching the back cover is partially transmitted each time, and phases of the transmitted millimeter wave signal are equal to the phases of the millimeter wave signal reaching the back cover, the phases of the millimeter wave signal transmitted each time are the same, and millimeter wave signals with same phases are reinforced and gained each other. Therefore, a final overall return loss is low, so that much of electromagnetic wave energy flows across the back cover, and high gain effect is obtained. In comparison with a case that the in-phase reflection structure is not disposed, the at least one of the back cover and the circuit board is disposed with an in-phase reflection structure A1, so that the phases of the millimeter wave signal reaching the back cover each time are the same when the millimeter wave signal sent by the millimeter wave antenna module is reflected a plurality of times between the circuit board and the back cover in a shorter distance. This reduces a thickness of the whole electronic device and improves radiation performance of the antenna.

In a possible implementation, when the back cover or the circuit board is disposed with the in-phase reflection structure, the back cover or the circuit board that is disposed with the in-phase reflection structure reflects the received millimeter wave signal, and the phase of the received millimeter wave signal is the same as that of the reflected millimeter wave signal. When the back cover or the circuit board is not disposed with the in-phase reflection structure, the back cover or the circuit board that is not disposed with the in-phase reflection structure reflects the received millimeter wave signal, and a difference between phases of the reflected millimeter wave signal and the received millimeter wave signal is $-\pi$. The phase of the millimeter wave signal received by the in-phase reflection structure is the same as that of the reflected millimeter wave signal, that is, before and after a reflection, a variation of a phase of a millimeter wave signal reflected by the in-phase reflection structure is zero, therefore, only a direction of the millimeter wave signal is varied, but the phase remains unvaried. By disposing the in-phase reflection structure on the at least one of the back cover and the circuit board, the phases of the millimeter wave signal reaching the back cover each time are the same when the millimeter wave signal sent by the millimeter wave antenna module is reflected a plurality of times between the circuit board and the back cover in a shorter distance.

In a possible implementation, the distance between the circuit board and the back cover is related to a first variation phase after a reflection by the back cover, a second variation phase after a reflection by the circuit board, and a wavelength of the millimeter wave signal.

In a possible implementation, the distance between the circuit board and the back cover is $d=n*\lambda/2-(\Delta\varphi1+\Delta\varphi2)*\lambda/4\pi$, where $\Delta\varphi1$ represents the first variation phase varied after a reflection by the back cover, $\Delta\varphi2$ represents the second variation phase varied after a reflection by the circuit board, $\lambda$ represents the wavelength of the millimeter wave signal, and n is 0 or a positive integer. It can be seen from the formula that, on a premise that when the millimeter wave signal sent by the millimeter wave antenna module is reflected a plurality of times between the circuit board and the back cover, the phases of the millimeter wave signal reaching the back cover each time are the same, and when at least one of $\Delta\varphi1$ and $\Delta\varphi2$ is equal to zero, a distance d may be effectively reduced.

In a possible implementation, when only the back cover is disposed with the in-phase reflection structure, the distance between the circuit board and the back cover is a distance between the circuit board that is not disposed with the in-phase reflection structure and the back cover that is disposed with the in-phase reflection structure, and is obtained based on a first variation phase after a reflection by the back cover that is disposed with the in-phase reflection structure, a second variation phase after a reflection by the circuit board that is not disposed with the in-phase reflection structure, and the wavelength of the millimeter wave signal. Alternatingly, when only the circuit board is disposed with the in-phase reflection structure, the distance between the circuit board and the back cover is a distance between the circuit board that is disposed with the in-phase reflection structure and the back cover that is not disposed with the in-phase reflection structure, and is obtained based on a first variation phase after a refection by the back cover that is not disposed with the in-phase reflection structure, a second variation phase after a refection by the circuit board that is disposed with the in-phase reflection structure, and the wavelength of the millimeter wave signal. Alternatingly, when both the back cover and the circuit board each are disposed with the in-phase reflection structure, the distance between the circuit board and the back cover is a distance between the circuit board that is disposed with the in-phase reflection structure and the back cover that is disposed with the in-phase reflection structure, and is obtained based on a first variation phase after a reflection by the back cover that is disposed with the in-phase reflection structure, a second variation phase after a reflection reflected by the circuit board that is disposed with the in-phase reflection structure, and the wavelength of the millimeter wave signal. That is, in this embodiment of this application, if the circuit board or the back cover is disposed with the in-phase reflection structure, it should be understood as that the circuit board or the back cover is disposed with the in-phase reflection structure. If the circuit board or the back cover is not disposed with the in-phase reflection structure, it should be understood as that the circuit board or the back cover is not disposed with the in-phase reflection structure.

In a possible implementation, when only the back cover is disposed with the in-phase reflection structure, $\Delta\varphi 1=0$, and $\Delta\varphi 2=-\pi$, the distance between the circuit board and the back cover is the distance between the circuit board and the back cover that is disposed with the in-phase reflection structure and is equal to $\lambda/4+n*\lambda/2$. Therefore, when only the back cover is disposed with the in-phase reflection structure, because of $\Delta\varphi 1=0$, on a premise that the millimeter wave signal sent by the millimeter wave antenna module is reflected a plurality of times between the circuit board and the back cover, and the phases of the millimeter wave signal reaching the back cover each time are the same, the distance d is effectively reduced.

In a possible implementation, when only the circuit board is disposed with the in-phase reflection structure, $\Delta\varphi 1=-\pi$, and $\Delta\varphi 2=0$, the distance between the circuit board and the back cover is the distance between the circuit board that is disposed with the in-phase reflection structure and the back cover and is equal to $\lambda/4+n*\lambda/2$. Therefore, when only the circuit board is disposed with the in-phase reflection structure, because of $\Delta\varphi 2=0$, on a premise that the millimeter wave signal sent by the millimeter wave antenna module is reflected a plurality of times between the circuit board and the back cover, and the phases of the millimeter wave signal reaching the back cover each time are the same, the distance d is effectively reduced.

In a possible implementation, when both the circuit board and the back cover each are disposed with the in-phase reflection structure, $\Delta\varphi 1=0$, and $\Delta\varphi 2=0$, the distance between the circuit board and the back cover is the distance between the circuit board that is disposed with the in-phase reflection structure and the back cover that is disposed with the in-phase reflection structure and is equal to $n*\lambda/2$. Therefore, when the circuit board or the back cover is disposed with the in-phase reflection structure, because of $\Delta\varphi 1=0$ and $\Delta\varphi 2=0$, on a premise that the millimeter wave signal sent by the millimeter wave antenna module is reflected a plurality of times between the circuit board and the back cover, and the phases of the millimeter wave signal reaching the back cover each time are the same, the distance d is further reduced.

In a possible implementation, the in-phase reflection structure is a single-layer structure. When the back cover is disposed with the in-phase reflection structure, the in-phase reflection structure is disposed on a surface of the back cover facing the circuit board. Alternatively, the circuit board is disposed with the in-phase reflection structure, the in-phase reflection structure is disposed on the surface of the circuit board facing the back cover. When the in-phase reflection structure is the single-layer structure, only the in-phase reflection structure needs to be disposed on a side of the back cover facing the circuit board. This does not affect an appearance of the back cover and simplifies the process.

In a possible implementation, the in-phase reflection structure includes a plurality of reflection units disposed at intervals, and each reflection unit is a single-layer metal structure.

In a possible implementation, the back cover includes an inner film layer and a back cover body that are stacked in sequence. The inner film layer has a specific pattern and/or color. The back cover body is made of a transparent material, and the inner film layer is disposed on a surface of the back cover body facing the circuit board. When the back cover is disposed with the in-phase reflection structure, the in-phase reflection structure is disposed on a surface of the inner film layer facing the circuit board. When the in-phase reflection structure is the single-layer structure, the back cover includes only an inner film layer and a back cover body. This simplifies the process.

In a possible implementation, when the back cover is disposed with the in-phase reflection structure, the millimeter wave signal reaching the back cover each time is a millimeter wave signal reaching the reflection unit, and the distance between the circuit board and the back cover satisfies that phases of the millimeter wave signal reaching the reflection unit each time are the same.

In a possible implementation, that the in-phase reflection structure is a double-layer structure includes a first structure layer and a second structure layer. When the back cover is disposed with the in-phase reflection structure, the first structure layer of the in-phase reflection structure is disposed on a surface of the back cover facing the circuit board, and the second structure layer is disposed in the back cover. Alternatively, when the circuit board is disposed with the in-phase reflection structure, the first structure layer of the in-phase reflection structure is disposed on the surface of the circuit board facing the back cover, and the second structure layer is disposed on a layer of the circuit board or on a surface of the circuit board facing away from the back cover. By setting the in-phase reflection structure as the double-layer structure, because the double-layer structure is more conducive to implement in-phase reflection of the millimeter wave signal, an in-phase reflection property of the in-phase reflection structure may be effectively improved.

In a possible implementation, the in-phase reflection structure includes a plurality of reflection units disposed at intervals. Each reflection unit includes a first reflection structure and a second reflection structure. First reflection structures of all the reflection units form the first structure layer, and second reflection structures of all the reflection units form the second structure layer.

In a possible implementation, when the back cover is disposed with the in-phase reflection structure, the millimeter wave signal reaching the back cover each time is a millimeter wave signal reaching the first reflection structure, and the distance between the circuit board and the back cover satisfies that phases of the millimeter wave signal reaching the first reflection structure each time are the same.

In a possible implementation, the first reflection structure and the second reflection structure of each reflection unit are correspondingly disposed in a thickness direction of the back cover.

In a possible implementation, the first reflection structure is a square metal sheet, and the second reflection structure is a cross metal sheet. Because the first reflection structure is a square metal sheet, and the second reflection structure is a cross metal sheet, the in-phase reflection property may be effectively improved.

In a possible implementation, a projection of a square metal sheet of each reflection unit coincides with a projection of a geometric center of the cross metal sheet in the thickness direction of the back cover. By setting the first reflection structure as a square metal sheet and setting the second reflection structure as a cross metal sheet, and under a condition that the projections of the geometric centers of the square metal sheet and the cross-shaped metal sheet of each reflection unit overlap in the thickness direction of the back cover, precision of in-phase reflection may be effectively improved.

In a possible implementation, the back cover includes an inner film layer, a back cover body, and an outer film layer that are stacked in sequence. The inner film layer is disposed on a surface of the back cover body facing the circuit board, and the outer film layer is disposed on a surface of the back cover body facing away from the circuit board. When the back cover is disposed with the in-phase reflection structure, the first structure layer of the in-phase reflection structure is disposed on a surface of the inner film layer facing the circuit board, and the second structure layer is disposed between the back cover body and the outer film layer.

In a possible implementation, the inner film layer has a specific pattern and/or color. The back cover body is made of a glass material, and the outer film layer is made of a transparent material. The outer film layer is used to protect the second structure layer. The pattern and/or color of the inner film layer is presented through the back cover body and the outer film layer and adopted as a pattern and/or color of the back cover.

In this application, by setting a preset distance between the circuit board and the back cover, when the millimeter wave signal sent by the millimeter wave antenna module is reflected a plurality of times between the circuit board and the back cover, the phases of the millimeter wave signal reaching the back cover each time are the same. Because the millimeter wave signal reaching the back cover is partially transmitted each time, and the phase of the transmitted millimeter wave signal are equal to the phases of the millimeter wave signal reaching the back cover, the phases of the millimeter wave signal transmitted each time are the same, and millimeter wave signals with same phases are reinforced and gained each other. Therefore, a final overall return loss is low, so that much of electromagnetic wave energy flows across the back cover, and high gain effect is obtained. In comparison with a case that the in-phase reflection structure is not disposed, in this application, the at least one of the back cover and the circuit board is disposed with an in-phase reflection structure, so that the phases of the millimeter wave signal reaching the back cover each time are the same when the millimeter wave signal sent by the millimeter wave antenna module is reflected a plurality of times between the circuit board and the back cover in a shorter distance. This reduces a thickness of the whole electronic device and improves radiation performance of the antenna.

BRIEF DESCRIPTION OF DRAWINGS

To describe the technical solutions in embodiments of this application or in the background more clearly, the following describes the accompanying drawings required for describing embodiments of this application or the background.

DESCRIPTION OF EMBODIMENTS

The following describes embodiments of this application with reference to the accompanying drawings in embodiments of this application.

Figure 1:
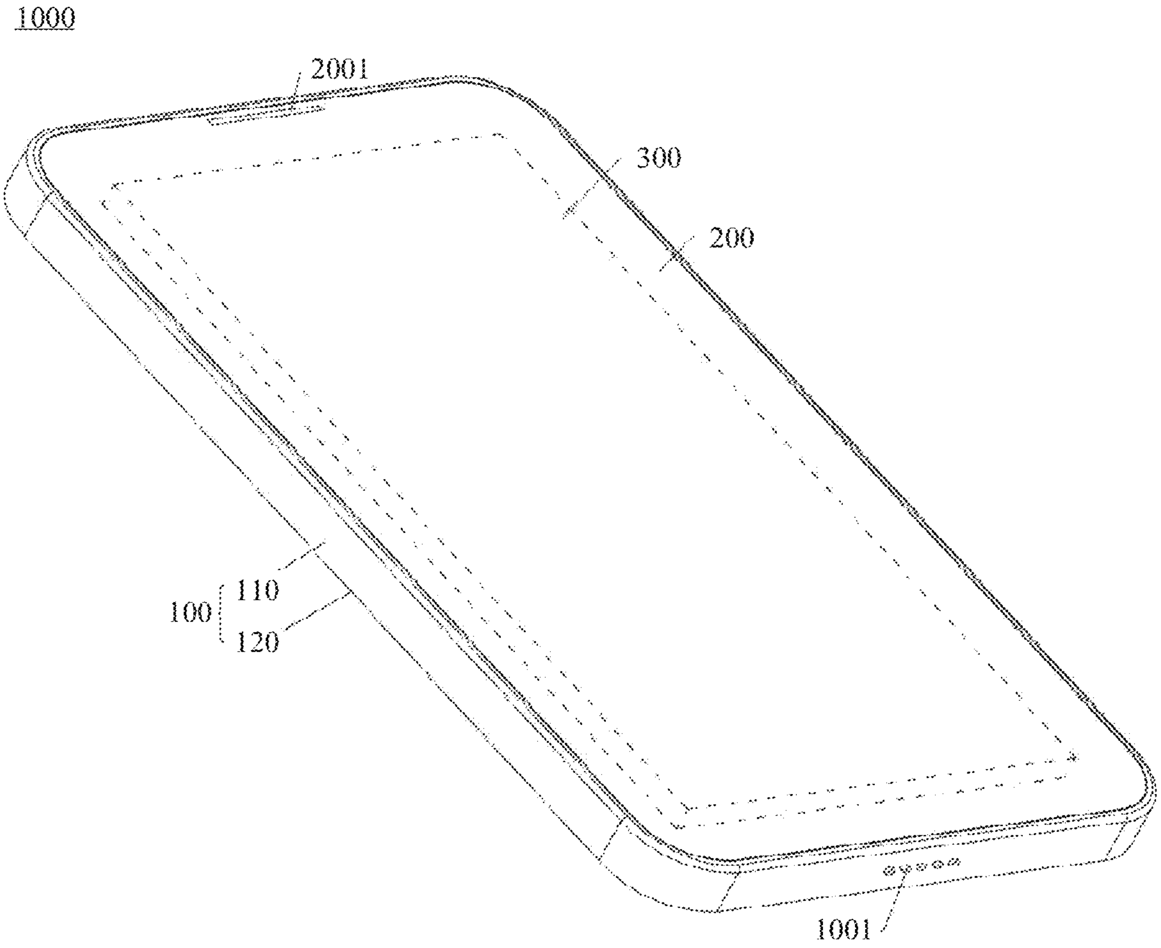
FIG. 1 is a schematic diagram of a structure of an electronic device with a millimeter wave antenna module according to an embodiment of this application.

FIG. 1 is a schematic diagram of a structure of an electronic device 1000 with a millimeter wave antenna module (referred to as electronic device 1000 for short in this application) according to this embodiment of this application.

The electronic device 1000 may be an electronic device having a wireless communication function, for example, a handheld device, an in-vehicle device, a wearable device, a computer device, a wireless local area network (WLAN, wireless local area network) device, or a router. In some application scenarios, the electronic device 1000 may also be referred to as a different name, for example, user equipment, an access terminal, a subscriber unit, a subscriber station, a mobile site, a mobile station, a remote station, a remote terminal, a mobile device, a user terminal, a wireless electronic device, a user agent or a user apparatus, a cellular phone, a wireless phone, a session initiation protocol (SIP, session initiation protocol) phone, a wireless local loop (WLL, wireless local loop) station, a personal digital assistant (PDA, personal digital assistant), or a terminal device in a 5G network or future evolution network.

In some embodiments, the electronic device 1000 may also be a device deployed in a wireless access network to provide wireless communication functions, including but not limited to: a base station, a relay station, an access point, an in-vehicle device, a wireless-fidelity (Wi-Fi, wireless-fidelity) site, a wireless backhaul node, a small cell, a micro station, or the like. The base station may be a base transceiver station (BTS, base transceiver station), a node B (Node B. NB), an evolved node B (evolved Node B, eNB, or eNodeB), a transmission node or a transmission reception point (transmission reception point, TRP, or TP) or a next generation node B (generation node B, gNB) in a new radio system (NR, new radio), a base station or a network device in a future communication system, or the like. In this embodiment of this application, an example in which the electronic device 1000 is a mobile phone is used for description.

The electronic device 1000 includes a housing 100, a display module 200, a circuit board 300, a receiver (not shown in the figure), and a speaker (not shown in the figure). The display module 200 is installed in the housing 100 and matched with the housing 100 to form an accommodation cavity. The circuit board 300, the receiver, and the speaker are installed in the accommodation cavity.

The housing 100 may include a frame 110 and a back cover 120. The back cover 120 is fastened to one side of the frame 110. The frame 110 and the back cover 120 may be integrally formed to ensure structure stability of the housing 100. Alternatively, the frame 110 and the back cover 120 may be fastened to each other through assembling. The housing 100 is disposed with a speaker hole 1001. There may be one or more speaker holes 1001. For example, there are a plurality of speaker holes 1001, and the plurality of speaker holes 1001 are disposed at the frame 110. The speaker hole 1001 is connected to an inner side of the housing 100 and an outer side of the housing 100. It should be noted that the "hole" described in this embodiment of this application refers to a hole having a complete hole wall.

The display module 200 is fastened on the other side of the frame 110. The display module 200 and the back cover 120 are respectively fastened on two sides of the frame 110. When a user uses the electronic device 1000, the display module 200 is placed toward the user, and the back cover 120 is placed away from the user. The display module 200 is disposed with a receiving hole 2001, and the receiving hole 2001 is a through hole penetrating the display module 200. A surface of the display module 200 is a front face of the electronic device 1000, and a surface of the electronic device 1000 facing away from the display module 200 is a back face of the electronic device 1000. The back cover 120 is configured to encapsulate the back face of the electronic device 1000. The display module 200 includes a display and a driving circuit of the display. The display module 200 may be a touchable display module.

The circuit board 300 is located between the back cover 120 and the display module 200. The circuit board 300 may be a main board (main board) of the electronic device 1000. The receiver is located at a top of the electronic device 1000. Sound emitted by the receiver may be transmitted to the outside of the electronic device 1000 from the receiving hole 2001, to implement a sound playing function of the electronic device 1000. The speaker is located at a bottom of the electronic device 1000. Sound emitted by the speaker may be transmitted to the outside of the electronic device 1000 from the speaker hole 1001, to implement a sound playing function of the electronic device 1000.

It should be understood that, in this embodiment of this application, orientations of the electronic device 1000 indicated by terms such as "top" and "bottom" are mainly orientations when the user uses the electronic device 1000 by hand. A position facing a top side of the electronic device 1000 is "top" and a position facing a bottom side of the electronic device 1000 is "bottom", which does not indicate or imply that the apparatus or element referred to must have a particular orientation, or must be constructed and operated in a particular orientation, and therefore shall not be construed as a limitation on the electronic device 1000 in an actual application scenario. In some embodiments, the bottom of the electronic device 1000 is an end portion on which a headphone hole and a USB hole are disposed. The top of the electronic device 1000 is the other end portion opposite to the end portion on which the headphone hole and the USB hole are disposed.

In this embodiment of this application, a thickness of the back cover 120 refers to a distance between an inner surface and an outer surface of the back cover 120. The inner surface and the outer surface of the back cover 120 refer to surfaces of the back cover 120 that are substantially parallel to a screen surface of the display module 200. A thickness direction refers to a direction that is perpendicular to the inner surface and the outer surface of the back cover 120, that is, a direction that is perpendicular to the screen surface of the display module 200.

Figure 2:
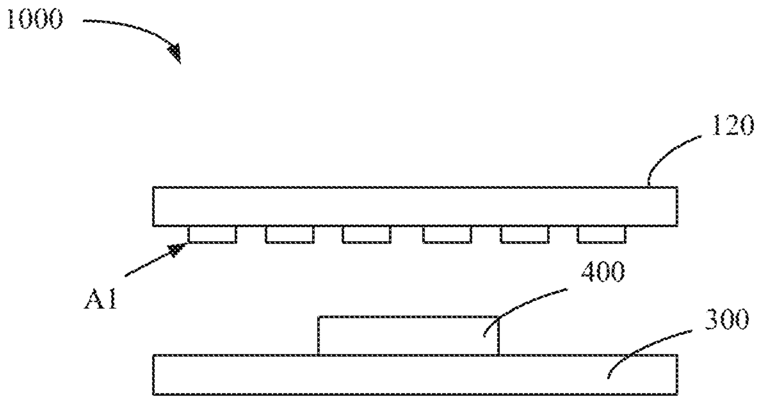
FIG. 2 is a schematic cross-sectional view of a partial structure of an electronic device with a millimeter wave antenna module according to an embodiment of this application.

FIG. 2 is a schematic cross-sectional view of a partial structure of the electronic device 1000 according to this embodiment of this application. As shown in FIG. 2, the electronic device 1000 includes the circuit board 300, the back cover 120, and a millimeter wave antenna module 400 disposed on the circuit board 300. The millimeter wave antenna module 400 is disposed on a side of the circuit board 300 facing the back cover 120. The millimeter wave antenna module 400 is configured to send and receive a millimeter wave signal. At least one of the back cover 120 and the circuit board 300 is disposed with an in-phase reflection structure A1. A millimeter wave signal sent by the millimeter wave antenna module 400 is reflected a plurality of times between the circuit board 300 and the back cover 120. A distance between the circuit board 300 and the back cover 120 satisfies that phases of a millimeter wave signal reaching the back cover 120 each time are the same.

Therefore, in this application, although the back cover 120 reflects the millimeter wave signal, by setting a distance between the circuit board 300 and the back cover 120, when the millimeter wave signal sent by the millimeter wave antenna module 400 is reflected a plurality of times between the circuit board 300 and the back cover 120, the phases of the millimeter wave signal reaching the back cover 120 each time are the same. Because the millimeter wave signal reaching the back cover 120 is partially transmitted each time, and phases of the transmitted millimeter wave signal are equal to the phases of the millimeter wave signal reaching the back cover 120, the phases of the millimeter wave signal transmitted each time are the same, and millimeter wave signals with same phases are reinforced and gained each other. Therefore, a final overall return loss is low, so that much of electromagnetic wave energy flows across the back cover, and high gain effect is obtained. In comparison with a case that the in-phase reflection structure A1 is not disposed, in this application, the at least one of the back cover 120 and the circuit board 300 is disposed with the in-phase reflection structure A1, so that the phases of the millimeter wave signal reaching the back cover 120 each time are the same when the millimeter wave signal sent by the millimeter wave antenna module 400 is reflected a plurality of times between the circuit board 300 and the back cover 120 in a shorter distance. This reduces a thickness of the whole electronic device and improves radiation performance of an antenna. A specific principle is described later.

In addition, when the back cover 120 or the circuit board 300 is not disposed with the in-phase reflection structure, a surface wave is formed when a small amount of millimeter wave signals sent to the back cover 120 or the circuit board 300 propagate along a surface of the back cover 120 or the circuit board 300. This causes an energy loss. In this application, because the at least one of the back cover 120 and the circuit board 300 is disposed with the in-phase reflection structure A1, when the millimeter wave signal reaches the surface of the back cover 120 or the circuit board 300, the surface wave formed when the signal propagates along the surface of the back cover 120 or the circuit board 300 may be reduced or even eliminated. This reduces the energy loss.

In this application, the back cover 120 is made of a material that partially reflects and partially transmits millimeter wave signal, for example, a glass material, or a ceramic material.

It should be noted that, "phases are the same" in this embodiment of this application is not an absolute and strict definition in mathematical sense, and a small amount of deviation is allowed, for example, the "phases are the same" means that the deviation is allowed to be within a preset phase range. For example, the "phases are the same" may mean that a difference between phases is within a range of $-\pi/30$ to $\pi/30$. Because a phase of $2\pi$ period is equal to 360°, after the phase is converted into an angle, the "phases are the same" means a difference between angles is within a range of −6° to 6°. The preset phase range may also be another smaller range.

The in-phase reflection structure A1 has an in-phase reflection property, that is, a phase of a millimeter wave signal received by the in-phase reflection structure A1 is the same as that of a reflected millimeter wave signal, that is, the phase remains unvaried. When the back cover 120 or the circuit board 300 is disposed with the in-phase reflection structure A1, the back cover 120 or the circuit board 300 that is disposed with the in-phase reflection structure A1 reflects the received millimeter wave signal, and the phase of the received millimeter wave signal is the same as that of the reflected millimeter wave signal, that is, the phase remains unvaried. When the back cover 120 or the circuit board 300 is not disposed with the in-phase reflection structure A1, as an ordinary object reflects an electromagnetic wave, the back cover 120 or the circuit board 3M) that is not disposed with the in-phase reflection structure A1 reflects the received millimeter wave signal, and a difference between phases of the reflected millimeter wave signal and the received millimeter wave signal is $-\pi$, that is, a phase of a millimeter wave signal received by the back cover 120 or the circuit board 300 that is not disposed with the in-phase reflection structure A1 is varied to $-\pi$ after the millimeter wave signal is reflected by the back cover 120 or the circuit board 30) that is not disposed with the in-phase reflection structure A1. A specific principle and a structure of the in-phase reflection structure A1 are introduced later.

The phase of the millimeter wave signal received by the in-phase reflection structure A1 is the same as that of the reflected millimeter wave signal, that is, before and after a reflection, a variation of a phase of a millimeter wave signal reflected by the in-phase reflection structure A1 is zero, therefore, only a direction of the millimeter wave signal is varied, but the phase remains unvaried. By disposing the in-phase reflection structure A1 on the at least one of the back cover 120 and the circuit board 300, the phases of the millimeter wave signal reaching the back cover 120 each time are the same when the millimeter wave signal sent by the millimeter wave antenna module 400 is reflected a plurality of times between the circuit board 300 and the back cover 120 in a shorter distance. A more specific principle is described later.

FIG. 2 shows an example in which only the back cover 120 is disposed with the in-phase reflection structure A1. Apparently, that at least one of the back cover 120 and the circuit board 300 is disposed with the in-phase reflection structure A1 includes: Only the back cover 120 is disposed with the in-phase reflection structure A1. Only the circuit board 300 is disposed with the in-phase reflection structure A1. The back cover 120 is disposed with the in-phase reflection structure A1.

Figure 3:
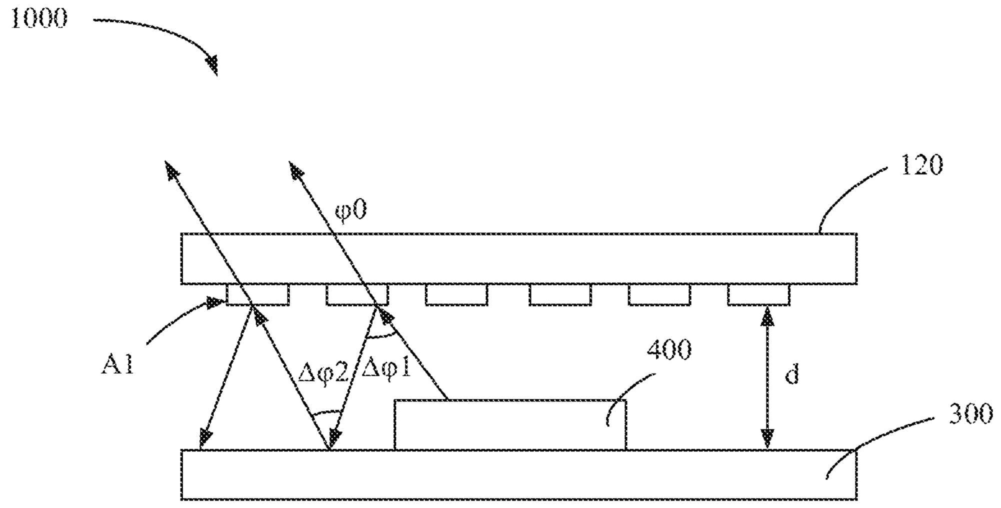
FIG. 3 is a schematic diagram in which a millimeter wave signal is reflected and transmitted a plurality of times between a circuit board and a back cover according to an embodiment of this application.

FIG. 3 is a schematic diagram in which a millimeter wave signal is reflected and transmitted a plurality of times between a circuit board and a back cover according to this embodiment of this application.

When a first variation phase of the millimeter wave signal after a reflection by the back cover 120 is set to $\Delta\varphi 1$, and a second variation phase after a reflection by the circuit board 300 is set to $\Delta\varphi 2$, that is, a difference between a phase of the millimeter wave signal after a reflection by the back cover 120 and the phase of the millimeter wave signal received by the back cover 120 is $\Delta\varphi 1$, and a difference between a phase of the millimeter wave signal after a reflection by the circuit board 300 and a phase of a millimeter wave signal received by the circuit board 300 is $\Delta\varphi 2$. A distance d between the circuit board 300 and the back cover 120 is related to a first variation phase $\Delta\varphi 1$ after a reflection by the back cover 120, a second variation phase $\Delta\varphi 2$ after a reflection by the circuit board 300, and a wavelength of the millimeter wave signal. That is, the distance d between the circuit board 300 and the back cover 120 may be obtained based on the first variation phase Δφ1 after a reflection by the back cover 120, the second variation phase Δφ2 after a reflection by the circuit board 300, and the wavelength of the millimeter wave signal.

As shown in FIG. 3, when the millimeter wave signal sent by the millimeter wave antenna module 400 reaches the back cover 120, the millimeter wave is partially transmitted and partially reflected. It is assumed that a phase of a current millimeter wave signal reaching the back cover 120 is set to 90. If a phase of a next millimeter wave signal reaching the back cover 120 is equal to φ0+2nπ (n=0, 1, 2 . . . , that is, n is 0 or a positive integer), a difference between the phase of the next millimeter wave signal and a phase φ0 of a previous millimeter wave signal reaching the back cover 120 is φ0+2nπ−φ0, that is, the difference is 0 or an integer multiple of 2π, and 2π is a phase of one period. Therefore, phases with a difference of an integer multiple of 2π are still the same, and an in-phase radiation condition is met, that is, the phases of the millimeter wave signal reaching the back cover 120 each time are the same.

Because the phase of the millimeter wave signal is varied by 2π when the millimeter wave signal is transmitted by a distance of one wavelength, it may be obtained that Δφ/S=2π/λ, that is, Δφ=2π*S/λ, where S represents a transmission distance, Δφ represents a phase varied after the electromagnetic wave is transmitted by the transmission distance S, and λ represents the wavelength of millimeter wave signal. Further, considering that the first variation phase of the millimeter wave signal after a reflection by the back cover 120 is Δφ1, the second variation phase after a reflection by the circuit board 300 is Δφ2, it is assumed that the distance between the circuit board 300 and the back cover 120 is d. In this case, a transmission distance between millimeter wave signals reaching the back cover 120 for two consecutive times is 2d. If it is required that a difference between a phase of this millimeter wave signal reaching the back cover and the phase of the previous millimeter wave signal reaching the back cover 120 is 2nπ, a sum of phase variation that is of the millimeter wave signal reaching the back cover 120 for two consecutive times and that is caused by the transmission distance, the first variation phase Δφ1, and the second variation phase Δφ2 needs to be 2nπ, and a first formula, that is, 2π*2d/λ+(Δφ1+Δφ2)=2nπ, may be obtained, where Δφ1 represents the first variation phase after a reflection by the back cover 120, Δφ2 represents the second variation phase after a reflection by the circuit board 300, λ represents the wavelength of millimeter wave signal, and n is 0 or a positive integer.

The first formula may be converted into a second formula: d=n*λ/2−(Δφ1+Δφ2)*λ/4π, where Δφ1 represents the first variation phase after a reflection by the back cover 120, Δφ2 represents the second variation phase after a reflection by the circuit board 300, λ represents the wavelength of the millimeter wave signal, and n is 0 or a positive integer.

Therefore, in this embodiment of this application, when the distance d between the circuit board 300 and the back cover 120 satisfies the second formula: d=n*λ/2−(Δφ1+Δφ2)*λ/4π, and the millimeter wave signal sent by the millimeter wave antenna module 400 is reflected a plurality of times between the circuit board 300 and the back cover 120, the phases of the millimeter wave signal reaching the back cover 120 each time are the same.

In this application, Δφ1 and Δφ2 are either 0, or −π. It can be seen from the second formula, the distance d between the circuit board 300 and the back cover 120 is positively correlated to an absolute value of the first variation phase Δφ1 varied after a reflection by the back cover 120 and an absolute value of the second variation phase Δφ2 varied after a reflection by the circuit board 300. Therefore, when at least one of the absolute value of the first variation phase Δφ1 and the absolute value of the second variation phase Δφ2 is reduced, and the millimeter wave signal sent by the millimeter wave antenna module 400 is reflected between the circuit board 300 and the back cover 120 a plurality of times, in a case that the phases of the millimeter wave signal reaching the back cover 120 each time are the same, the distance d is effectively reduced and the thickness of the whole electronic device is reduced.

When the circuit board 300 and the back cover 120 are not disposed with the in-phase reflection structure A1, a first variation phase Δφ1 varied after a reflection by the back cover 120 that is not disposed with the in-phase reflection structure A1 and a second variation phase Δφ2 varied after a reflection by the circuit board 300 that is not disposed with the in-phase reflection structure A1 are equal to −π, and d=n*λ/2−(−π+−π)*λ/4π=λ/2+n*λ/2.

In this embodiment of this application, by disposing the in-phase reflection structure A1 on at least one of the back cover 120 and the circuit board 300, when the back cover 120 or the circuit board 300 is disposed with the in-phase reflection structure A1, the back cover 120 or the circuit board 300 that is disposed with the in-phase reflection structure A1 reflects the received millimeter wave signal, and the phase of the received millimeter wave signal is the same as that of the reflected millimeter wave signal, that is, the phase remains unvaried. Therefore, when at least one of the first variation phase Δφ1 and the second variation phase Δφ2 is zero, an absolute value of (Δφ1+Δφ2) is obviously reduced, and when n phases are the same, the distance d is effectively reduced and the thickness of the whole electronic device is reduced.

In this embodiment of this application, when only the back cover 120 is disposed with the in-phase reflection structure A1, the distance between the circuit board 300 and the back cover 120 is a distance between the circuit board 300 that is not disposed with the in-phase reflection structure A1 and the back cover 120 that is disposed with the in-phase reflection structure A1, and is obtained based on a first variation phase Δφ1 after a reflection by the back cover 120 that is disposed with the in-phase reflection structure A1, a second variation phase Δφ2 after a reflection by the circuit board 300 that is not disposed with the in-phase reflection structure A1, and a wavelength λ of the millimeter wave signal. When only the circuit board 300 is disposed with the in-phase reflection structure A1, the distance between the circuit board 300 and the back cover 120 is a distance between the circuit board 300 that is disposed with the in-phase reflection structure A1 and the back cover 120 that is not disposed with the in-phase reflection structure A1, and is obtained based on a first variation phase Δφ1 after a reflection by the back cover 120 that is not disposed with the in-phase reflection structure A1, a second variation phase Δφ2 after a reflection by the circuit board 300 that is disposed with the in-phase reflection structure A1, and a wavelength), of the millimeter wave signal. When both the back cover 120 and the circuit board 300 each are disposed with the in-phase reflection structure A1, the distance between the circuit board 300 and the back cover 120 is a distance between the circuit board 300 that is disposed with the in-phase reflection structure A1 and the back cover 120 that is disposed with the in-phase reflection structure A1, and is obtained based on a first variation phase Δφ1 after a reflection by the back cover 120 that is disposed with the in-phase reflection structure A1, a second variation phase $\Delta\varphi 2$ after a reflection by the circuit board 300 that is disposed with the in-phase reflection structure A1, and a wavelength $\lambda$ of the millimeter wave signal.

That is, in this embodiment of this application, if the circuit board 300 or the back cover 120 is disposed with the in-phase reflection structure A1, it should be understood as that the circuit board 300 or the back cover 120 is disposed with the in-phase reflection structure A1. If the circuit board 300 or the back cover 120 is not disposed with the in-phase reflection structure A1, it should be understood as that the circuit board 300 or the back cover 120 is not disposed with the in-phase reflection structure A1.

Specifically, FIG. 2 and FIG. 3 are schematic diagrams in which only the back cover 120 is disposed with the in-phase reflection structure A1, that is, in this embodiment, only the back cover 120 is disposed with the in-phase reflection structure A1. When only the back cover 120 is disposed with the in-phase reflection structure A1, the first variation phase $\Delta\varphi 1$ after a reflection by a back cover 120 that is disposed with an in-phase reflection structure A1 is equal to 0, the second variation phase $\Delta\varphi 2$ after a reflection by the circuit board 300 that is not disposed with the in-phase reflection structure A1 is equal to $-\pi$, and the distance d between the circuit board 300 and the back cover 120 is a distance between the circuit board 300 and the back cover 120 that is disposed with the in-phase reflection structure A1. Therefore, the second formula may be further simplified as: $d=n*\lambda/2-(0+-\pi)*\lambda/4\pi=\lambda/4+n*\lambda/2$. Thus, when only the back cover 120 is disposed with the in-phase reflection structure A1, the distance d between the circuit board 300 and the back cover 120 is the distance between the circuit board 300 that is not disposed with the in-phase reflection structure A1 and the back cover 120 that is disposed with the in-phase reflection structure A1, and equal to $\lambda/4+n*\lambda/2$. When n is equal to 0, the distance d between the circuit board 300 and the back cover 120 is $\lambda/4$. Therefore, when only the back cover 120 is disposed with the in-phase reflection structure A1, and the millimeter wave signal sent by the millimeter wave antenna module 400 is reflected a plurality of times between the circuit board 300 and the back cover 120, in the case that the phases of the millimeter wave signal reaching the back cover 120 each time are the same, the shortest distance between the circuit board 300 and the back cover 120 may be $\lambda/4$.

It can be seen that, when only the back cover 120 is disposed with the in-phase reflection structure A1, and the millimeter wave signal sent by the millimeter wave antenna module 400 is reflected a plurality of times between the circuit board 300 and the back cover 120, in the case that the phases of the millimeter wave signal reaching the back cover 120 each time are the same, the distance d is effectively reduced and the thickness of the whole electronic device is reduced. By disposing the in-phase reflection structure A1 on the back cover 120, a procedure of assembling and manufacturing the whole electronic device may be simplified by improving only the back cover 120 of the electronic device 1000. The in-phase reflection structure A1 may be integrated with the back cover 120 when the back cover 120 is manufactured, that is, the back cover 120 being the in-phase reflection structure A1 may be integrated, so that a process is simplified.

Figure 4:
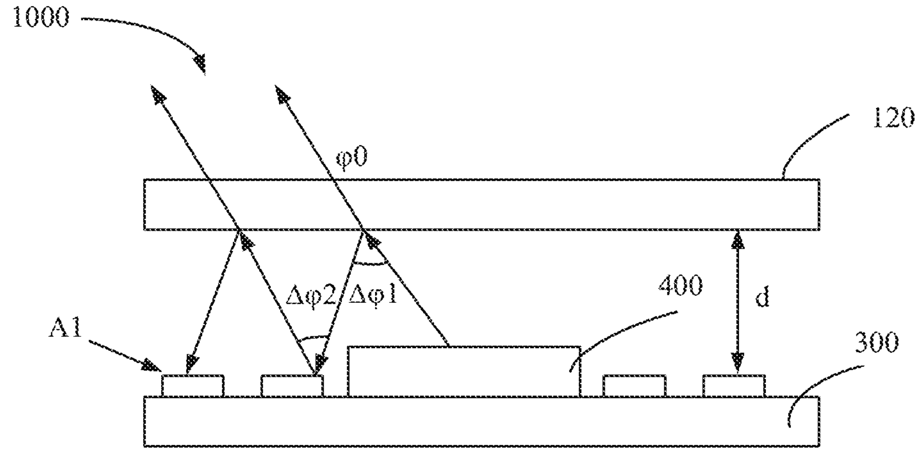
FIG. 4 is a schematic cross-sectional view of a partial structure of an electronic device with a millimeter wave antenna module according to another embodiment of this application.

FIG. 4 is a schematic cross-sectional view of a partial structure of an electronic device 1000 according to another embodiment of this application. As shown in FIG. 4, in another embodiment, only the circuit board 300 is disposed with the in-phase reflection structure A1, as described previously, when only the circuit board 300 is disposed with the in-phase reflection structure A1, the distance between the circuit board 300 and the back cover 120 is the distance between the circuit board 300 that is disposed with the in-phase reflection structure A1 and the back cover 120 that is not disposed with the in-phase reflection structure A1, and obtained based on the first variation phase $\Delta\varphi 1$ after a reflection by the back cover 120 that is not disposed with the in-phase reflection structure A1, the second variation phase $\Delta\varphi 2$ after a reflection by the circuit board 300 that is disposed with the in-phase reflection structure A1, and the wavelength $\lambda$ of the millimeter wave signal.

Specifically, when only the circuit board 300 is disposed with the in-phase reflection structure A1, a first variation phase $\Delta\varphi 1$ after a reflection by the back cover 120 that is not disposed with the in-phase reflection structure A1 is equal to $-\pi$, a second variation phase $\Delta\varphi 2$ after a reflection by the circuit board 300 that is disposed with the in-phase reflection structure A1 is equal to 0, and the distance d between the circuit board 300 and the back cover 120 is a distance between the back cover 120 that is not disposed with the in-phase reflection structure A1 and the circuit board 300 that is disposed with the in-phase reflection structure A1. Therefore, the second formula may be further simplified as: $d=n*\lambda/2-(-\pi+0)*\lambda/4\pi=\lambda/4+n*\lambda/2$. When only the circuit board 300 is disposed with the in-phase reflection structure A1, the distance d between the circuit board 300 and the back cover 120 is the distance between the circuit board 300 that is disposed with the in-phase reflection structure A1 and the back cover 120 that is not disposed with the in-phase reflection structure A1 and is equal to $\lambda/4+n*\lambda/2$. When n is equal to 0, the distance d between the circuit board 300 and the back cover 120 is $\lambda/4$. Therefore, when only the circuit board 300 is disposed with the in-phase reflection structure A1, and the millimeter wave signal sent by the millimeter wave antenna module 400 is reflected a plurality of times between the circuit board 300 and the back cover 120, in a case that the phases of the millimeter wave signal reaching the back cover 120 each time are the same, the shortest distance between the circuit board 300 and the back cover 120 may be $\lambda/4$.

It can be seen that, when only the circuit board 300 is disposed with the in-phase reflection structure A1, and the millimeter wave signal sent by the millimeter wave antenna module 400 is reflected a plurality of times between the circuit board 300 and the back cover 120, in the case that the phases of the millimeter wave signal reaching the back cover 120 each time are the same, the distance d is effectively reduced and the thickness of the whole electronic device is reduced. By disposing the in-phase reflection structure A1 on the circuit board 300, a structure and an appearance of the back cover are not affected, an appearance of the whole electronic device is not affected, and an additional outer coating does not need to be disposed. The in-phase reflection structure A1 may be integrated with the circuit board 300 when the circuit board 300 is manufactured, that is, the circuit board 300 being the in-phase reflection structure A1 may be integrated, so that a process is simplified.

Figure 5:
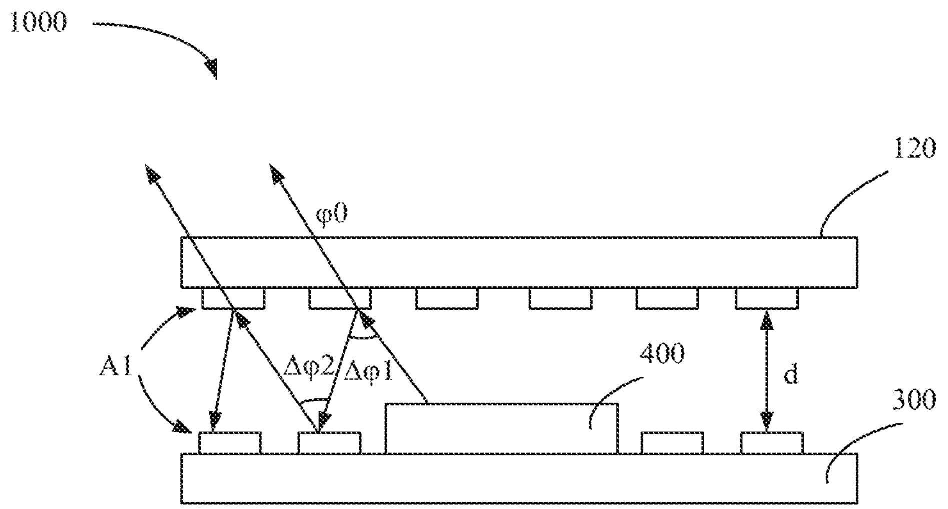
FIG. 5 is a schematic cross-sectional view of a partial structure of an electronic device with a millimeter wave antenna module according to still another embodiment of this application.

FIG. 5 is a schematic cross-sectional view of a partial structure of an electronic device 1000 according to still another embodiment of this application. As shown in FIG. 5, in another embodiment, the back cover 120 and the circuit board 300 are disposed with the in-phase reflection structure A1, as described previously, when the back cover 120 and the circuit board 300 are disposed with the in-phase reflection structure A1, the distance between the circuit board 300 and the back cover 120 is the distance between the circuit board 300 that is disposed with the in-phase reflection structure A1 and the back cover 120 that is disposed with the in-phase reflection structure A1, and obtained based on the first variation phase Δφ1 after a reflection by the back cover 120 that is disposed with the in-phase reflection structure A1, the second variation phase Δφ2 after a reflection by the circuit board 300 that is disposed with the in-phase reflection structure A1, and the wavelength λ of the millimeter wave signal.

Specifically, when the back cover 120 and the circuit board 300 are disposed with the in-phase reflection structure A1, a first variation phase Δφ1 after a reflection by the back cover 120 that is disposed with the in-phase reflection structure A1 is equal to 0, a second variation phase Δφ2 after a reflection by the circuit board 300 that is disposed with the in-phase reflection structure A1 is equal to 0, and the distance d between the circuit board 300 and the back cover 120 is the distance between the circuit board 300 that is disposed with the in-phase reflection structure A1 and the back cover 120 that is disposed with the in-phase reflection structure A1. Therefore, the second formula may be further simplified as: d=(0+0)*λ/4π+n*λ/2=n*λ/2. When the back cover 120 and the circuit board 300 are disposed with the in-phase reflection structure A1, the distance d between the circuit board 300 and the back cover 120 is the distance between the circuit board 300 that is disposed with the in-phase reflection structure A1 and the back cover 120 that is disposed with the in-phase reflection structure A1 and is equal to n*λ/2.

Therefore, when the back cover 120 and the circuit board 300 are disposed with the in-phase reflection structure A1, and the millimeter wave signal sent by the millimeter wave antenna module 400 is reflected a plurality of times between the circuit board 300 and the back cover 120, in the case that the phases of the millimeter wave signal reaching the back cover 120 each time are the same, a required distance is shorter in comparison with the case that one of the back cover 120 and the circuit board 300 is disposed with the in-phase reflection structure A1. Therefore, the distance between the back cover 120 and the circuit board 300 may further be reduced and the thickness of the while device may be reduced.

Theoretically, when n=0, the distance between the circuit board 300 that is disposed with the in-phase reflection structure A1 and the back cover 120 that is disposed with the in-phase reflection structure A1 is equal to 0*λ/2, that is, equal to zero. However, to meet a space requirement for propagating the millimeter wave signal and to avoid direct contact between the back cover 120 and the circuit board 300, in this application, when n=0, the distance between the circuit board 300 that is disposed with the in-phase reflection structure A1 and the back cover 120 that is disposed with the in-phase reflection structure A1 is approximately zero, but not equal to zero. For example, the distance between the circuit board 300 that is disposed with the in-phase reflection structure A1 and the back cover 120 that is disposed with the in-phase reflection structure A1 is smaller than a preset value, and the preset value may be 1/m of the wavelength, and m may be a value of 100, 110, 120, and so on.

As described previously, because the phase of the millimeter wave signal is varied by 2π when the millimeter wave signal is transmitted by a distance of one wavelength, a transmission distance that the millimeter wave signal reaching the back cover 120 reaches the circuit board 300 and is reflected to the back cover 120, reaches the circuit board 300, and is reflected to the back cover 120 again is 2d, that is, twice the distance d between the circuit board 300 that is disposed with the in-phase reflection structure A1 and the back cover 120 that is disposed with the in-phase reflection structure A1. Because phase variations of the circuit board 300 that is disposed with the in-phase reflection structure A1 and the back cover 120 that is disposed with the in-phase reflection structure A1 are both zero, a phase variation of the millimeter wave signal reaching the back cover 120 for two consecutive times is Δφ=2π*2d/λ when the signal is transmitted by the transmission distance **2*d***.

Generally, the smaller the phase variation, the better. That is, to ensure that the phases of the millimeter wave signal reaching the back cover 120 for two consecutive times are basically the same, as described previously, the phase variation is between −π/30 and π/30, that is, an absolute value of the phase variation is 0 and π/30. By substituting Δφ=2π*2d/λ, it may be obtained that 2π*2d/λ is between 0 and π/30. Therefore, in an embodiment, d may be a value that is greater than 0 and that is approximately λ/120. Apparently, the foregoing is only an example. When the phases are the same, a phase variation Δφ is within a range thereof, and the back cover 120 and the circuit board 300 are disposed with the in-phase reflection structure A1, the distance between the circuit board 300 that is disposed with the in-phase reflection structure A1 and the back cover 120 that is disposed with the in-phase reflection structure A1 may be another suitable value. When the millimeter wave signal sent by the millimeter wave antenna module 400 is reflected a plurality of times between the circuit board 300 and the back cover 120, and the phases of the millimeter wave signal reaching the back cover 120 each time are basically the same, the millimeter wave signal reaching the back cover 120 each time may be gained each other, to achieve high gain effect.

Figure 6:
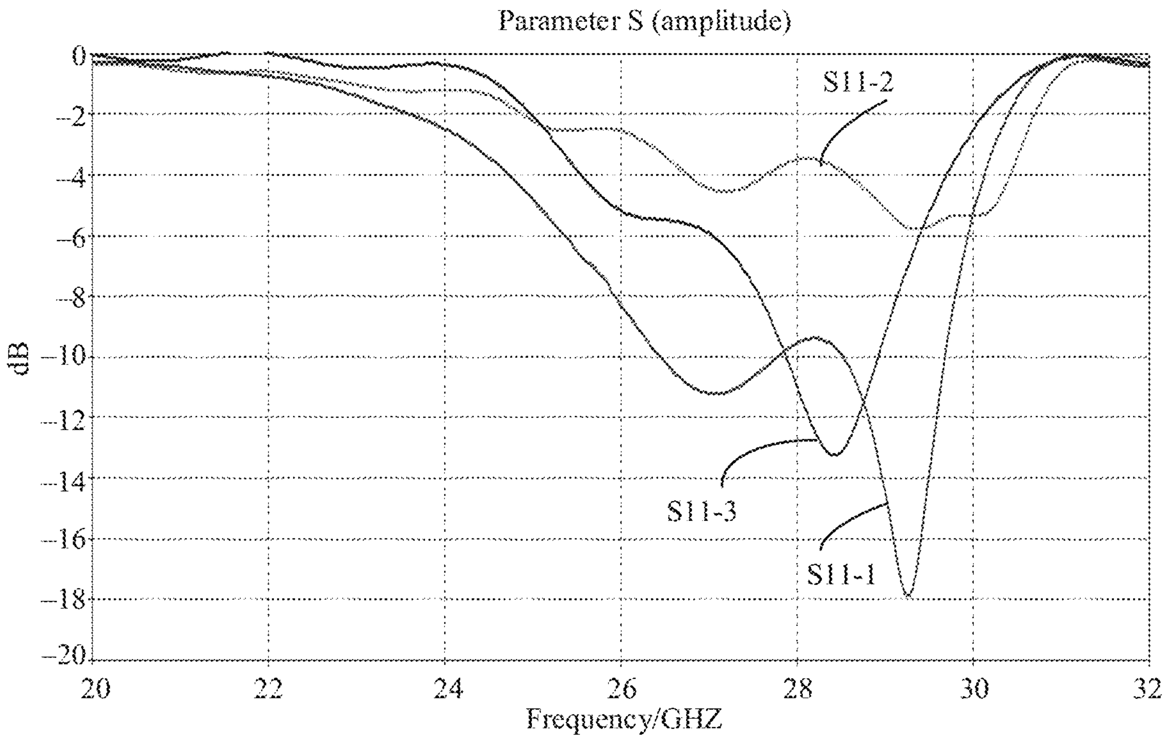
FIG. 6 is a schematic diagram of a return loss obtained through simulating a millimeter wave signal in a plurality of cases according to an embodiment of this application.

FIG. 6 is a schematic diagram of an overall return loss obtained through simulating a millimeter wave signal in a plurality of cases according to this embodiment of this application. As shown in FIG. 6, an abscissa is frequency (in GHz) and an ordinate is a return loss, also called an S parameter (in dB). The many cases include (1) case 1: free space (there is no back cover above the millimeter wave antenna module); (2) case 2: There is the back cover above the millimeter wave antenna module, the distance between the back cover and the circuit board is λ/4, and the back cover and the circuit board are not disposed with the in-phase reflection structure; and (3) case 3: There is the back cover above the millimeter wave antenna module, the distance between the back cover and the circuit board is λ/4, and the back cover is disposed with the in-phase reflection structure.

The millimeter wave signal is a millimeter wave signal with frequency of 28 GHz and is used as a test signal. According to the wavelength λ=v/f, a wavelength of the free space is 10.7 mm, where v represents a propagation speed of the millimeter wave signal in the free space, and is $3*10^8$ m/s, and f represents frequency of the electromagnetic wave, that is, 28 GHz as described earlier previously.

The case 1 is assumed that is an input return loss in the free space is S11-1. The case 2 is assumed that there is the back cover above the millimeter wave antenna module, the distance between the back cover and the circuit board is λ/4, and the input return loss is S11-2 when the back cover and the circuit board are not disposed with the in-phase reflection structure. The case 3 is assumed that there is the back cover above the millimeter wave antenna module, the distance between the back cover and the circuit board is λ/4, and the input return loss is S11-3 when the back cover is disposed with the in-phase reflection structure. The input return loss is a reflection coefficient of the millimeter wave signal sent by the millimeter wave antenna module. When the input return loss is lower, a loss of the millimeter wave signal is smaller.

As shown in FIG. 6, the input return loss S11-1 in the case 1 and the input return loss S11-3 in the case 3 are both smaller and significantly smaller than the input return loss S11-2 in the case 2. Specifically, as shown in FIG. 6, the input return loss S11-1 in the case 1 is about −18 dB, the input return loss S11-3 in the case 3 is about −13 dB, and the input return loss S11-2 in the case 2 is about −5 dB.

Through analysis, the case 1 is the free space case, that is, there is no back cover above the millimeter wave antenna module. In this case, the millimeter wave signal is not reflected by the back cover, so the return loss is low. The case 2 is that there is the back cover above the millimeter wave antenna module, the distance between the back cover and the circuit board is λ/4, and the back cover and the circuit board each are disposed with the in-phase reflection structure. As described previously, when the circuit board and the back cover are not disposed with the in-phase reflection structure, the first variation phase $\Delta\varphi 1$ after a reflection by the back cover that is not disposed with the in-phase reflection structure and the second variation phase $\Delta\varphi 2$ after a reflection by the circuit board 300 that is not disposed with the in-phase reflection structure A1 are equal to −π. Therefore, when the distance between the circuit board and the back cover is $d=n*\lambda/2-(\pi+\pi)*\lambda/4\pi=\lambda/2+n*\lambda/2$, it meets that when the millimeter wave signal sent by the millimeter wave antenna module is reflected a plurality of times between the circuit board and the back cover, the phases of the millimeter wave signal reaching the back cover each time are basically the same. Therefore, when there is the back cover above the millimeter wave antenna module, the distance between the back cover and the circuit board is λ/4, and the back cover and the circuit board that is not disposed with the in-phase reflection structure, it does not meet that when the millimeter wave signal sent by the millimeter wave antenna module is reflected a plurality of times between the circuit board and the back cover, the phases of the millimeter wave signal reaching the back cover each time are basically the same. Therefore, the return loss is high.

The case 3 is that there is the back cover above the millimeter wave antenna module, the distance between the back cover and the circuit board is λ/4, and the back cover is disposed with the in-phase reflection structure. As mentioned previously, when only the back cover is disposed with the in-phase reflection structure, and the distance between the back cover and the circuit board is λ/4, it meets that when the millimeter wave signal sent by the millimeter wave antenna module is reflected a plurality of times between the circuit board and the back cover, the phases of the millimeter wave signal reaching the back cover each time is basically the same, that is, phases of millimeter wave signals transmitted each time are the same. Therefore, all transmitted millimeter wave signals may be gained each other because of the same phases. In this case, an overall return loss is low, and full transmission effect is basically realized.

Therefore, the return loss diagram obtained by simulation proves that when only the back cover is disposed with the in-phase reflection structure and the distance between the back cover and the circuit board is λ/4, it meets that when the millimeter wave signal sent by the millimeter wave antenna module is reflected a plurality of times between the circuit board and the back cover, the phases of the millimeter wave signal reaching the back cover each time is basically the same.

FIG. 6 is specifically a schematic diagram of an overall return loss obtained when a millimeter wave signal is simulated to be transmitted in various cases.

Figure 7:
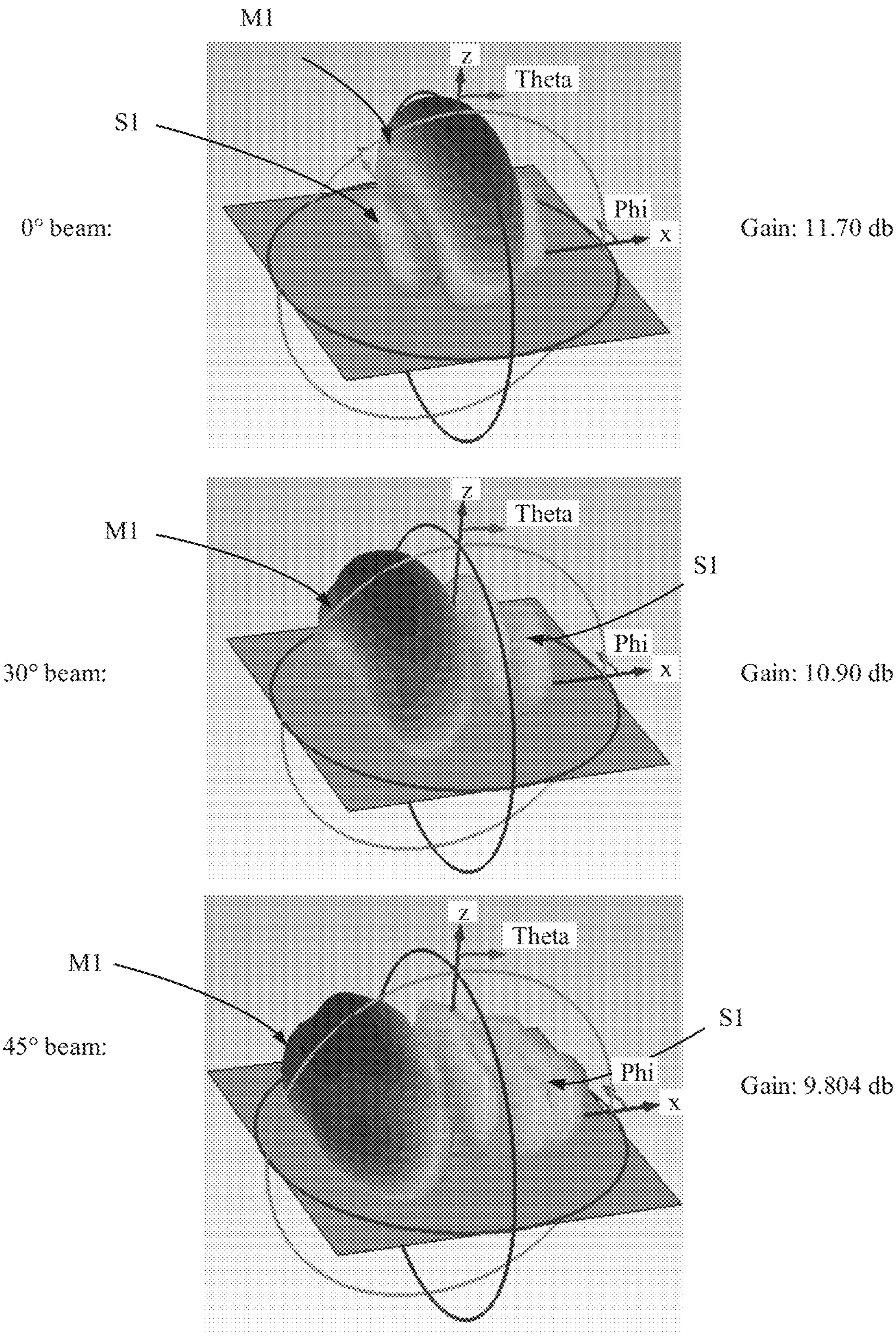
FIG. 7 to FIG. 9 are separately antenna radiation direction diagrams of a millimeter wave signal in a plurality of cases according to an embodiment of this application.
Figure 8:
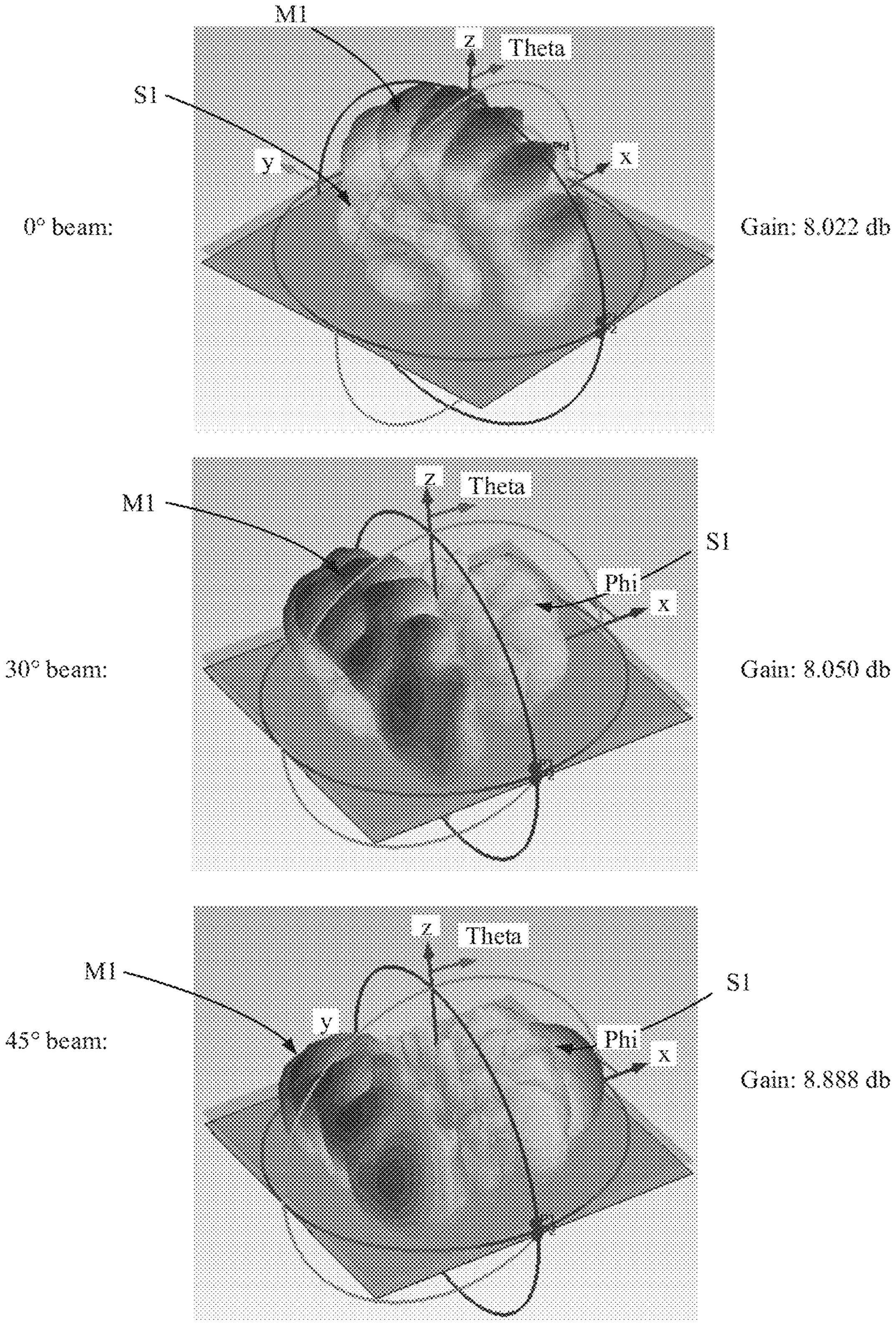
Figure 9:
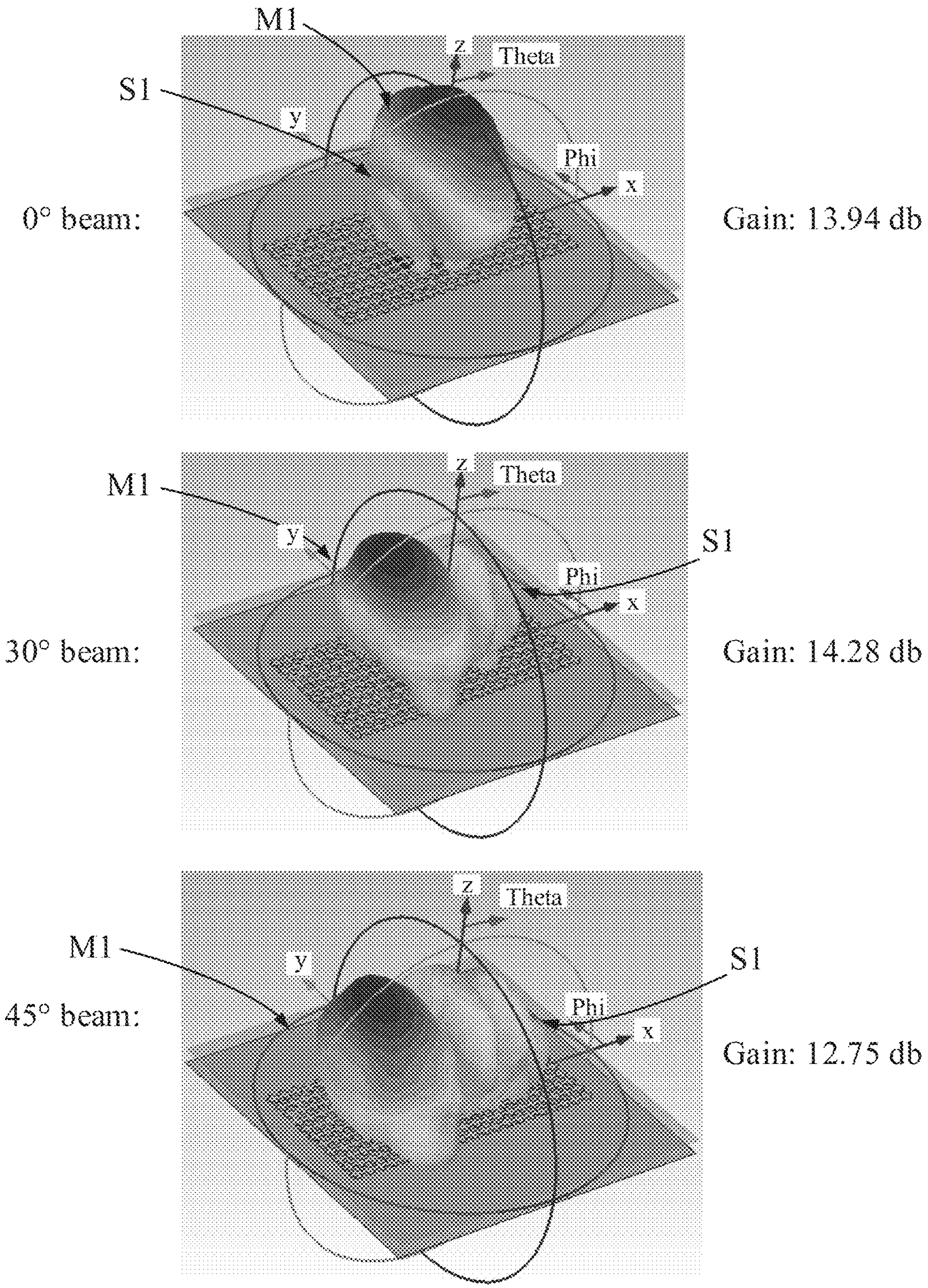

FIG. 7 to FIG. 9 are antenna radiation direction diagrams of a millimeter wave signal in the foregoing three cases according to this embodiment of this application. Specifically, FIG. 7 shows the case 1, that is, an antenna radiation direction diagram of the millimeter wave signal in a free space (there is no back cover above the millimeter wave antenna module). FIG. 8 shows the case 2, that is an antenna radiation direction diagram of the millimeter wave signal obtained when there is the back cover above the millimeter wave antenna module, the distance between the back cover and the circuit board is λ/4, and the back cover and the circuit board are not disposed with the in-phase reflection structure. FIG. 9 shows the case 3, that is, an antenna radiation direction diagram of the millimeter wave signal obtained when there is the back cover above the millimeter wave antenna module, the distance between the back cover and the circuit board is λ/4, and the back cover is disposed with the in-phase reflection structure.

The millimeter wave signal with frequency of 28 GHz is also used as the test signal, gain effect under beams in a plurality of directions is shown in the antenna radiation pattern of the millimeter wave signal in each case as shown in FIG. 7 to FIG. 9. The millimeter wave signal is scanned in a range of plus or minus 45°. In the antenna radiation pattern of the millimeter wave signal in each case shown in FIG. 7 to FIG. 9, 0°, 30°, and 45° are selected as examples for illustration.

In FIG. 7 to FIG. 9, a large dark part is a main lobe M1, and a small part beside the main lobe is a side lobe S1.

As shown in FIG. 7, in the case of the free space and the case that there is no back cover above the millimeter wave antenna module, when a main lobe M1 of a 0° beam of the millimeter wave signal is mainly concentrated in a 0° direction but the side lobe S1 is small, radiation energy is mainly concentrated in a main lobe M1 in the 0° direction. In this case, a loss of the 0° beam of the millimeter wave signal is small, and the gain is large, which is approximately 11.70 dB. When a main lobe M1 of a 30° beam of the millimeter wave signal is mainly concentrated in a 30° direction but the side lobe S1 is small, the radiation energy is mainly concentrated in a main lobe M1 in the 30° direction. In this case, a loss of the 30° beam of the millimeter wave signal is small, and the gain is large, which is approximately 10.60. As shown in FIG. 7, when a main lobe M1 of a 45° beam of the millimeter wave signal is mainly concentrated in a 45° direction but the side lobe S1 is small, the radiation energy is mainly concentrated in a main lobe M1 in the 45° direction. In this case, a loss of the 45° beam of the millimeter wave signal is small, and the gain is large, which is approximately 9.804 dB.

Therefore, it may be learned from the antenna radiation patterns under the beams in a plurality of directions, in the case of the free space and the case that there is no back cover above the millimeter wave antenna module, the return loss of the millimeter wave signal is low.

As shown in FIG. 8, in the case 2 that there is the back cover above the millimeter wave antenna module, the distance between the back cover and the circuit board is λ/4, and the back cover and the circuit board are not disposed with the in-phase reflection structure, as mentioned previously, when there is the back cover above the millimeter wave antenna module, the distance between the back cover and the circuit board is λ/4, and the back cover and the circuit board that is not disposed with the in-phase reflection structure, it does not meet that when the millimeter wave signal sent by the millimeter wave antenna module is reflected a plurality of times between the circuit board and the back cover, the phases of the millimeter wave signal reaching the back cover each time are basically the same. As shown in FIG. 8, the main lobe M1 of the 0° beam of the millimeter wave signal is scattered but the side lobe S1 is larger. In this case, although the gain is approximately 8.022 dB, the radiation energy is not concentrated, resulting in low radiation efficiency. As shown in FIG. 8, the side lobe S1 of the 30° beam of the millimeter wave signal is large. In this case, although the gain is approximately 8.050 dB, the side lobe S1 is obviously large, and the gain is actually gains of the main lobe M1 and the side lobe S1. Therefore, the 30° beam radiating facing the 30° direction becomes a scattered beam, resulting in low efficiency. As shown in FIG. 8, the side lobe S1 of the 45° beam of the millimeter wave signal is large. In this case, although the gain is approximately 8.888 dB, the side lobe S1 is large, and the gain is actually mostly a gain of the side lobe S1. Therefore, the 450 beam radiating facing the 45° direction becomes a scattered beam, resulting in low efficiency.

Therefore, it may also be learned from the antenna radiation patterns under the beams in a plurality of directions, in the case 2 that there is the back cover above the millimeter wave antenna module, the distance between the back cover and the circuit board is λ/4, and the back cover and the circuit board are not disposed with the in-phase reflection structure, the radiation efficiency is low, and the return loss of the millimeter wave signal is low.

As shown in FIG. 9, in the case 3 that there is the back cover above the millimeter wave antenna module, the distance between the back cover and the circuit board is λ/4, and the back cover is disposed with the in-phase reflection structure, the main lobe M1 of 0° beam of the millimeter wave signal is mainly concentrated in the 0° direction but the side lobe S1 is small. In this case, the radiation energy is mainly concentrated in the main lobe M1 in the 0° direction, the loss of the 0° beam of the millimeter wave signal is small, and the gain is large, which is approximately 13.94 dB, so that high gain effect of the 0° beam is implemented. The main lobe M1 of the 30° beam of the millimeter wave signal is mainly concentrated in the 30° direction but the side lobe S1 is small. In this case, the radiation energy is mainly concentrated in the main lobe M1 in the 30° direction. The loss of the 30° beam of the millimeter wave signal is small, and the gain is large, which is approximately 14.28 dB, so that high gain effect of the 30° beam is implemented. As shown in FIG. 9, the main lobe M1 of the 45° beam of the millimeter wave signal is mainly concentrated in the 45° direction but the side lobe S1 is small. In this case, the radiation energy is mainly concentrated in the main lobe M1 in the 45° direction. The loss of the 45° beam of the millimeter wave signal is small, and the gain is large, which is approximately 12.75 dB, so that high gain effect of the 45° beam is implemented. In the case 3, the radiation energy is mainly concentrated in the main lobe M1 in all directions, so the radiation efficiency is high.

Therefore, it may also be learned from the antenna radiation patterns of the beams in a plurality of directions, in the case 3 that there is the back cover above the millimeter wave antenna module, the distance between the back cover and the circuit board is λ/4, and the back cover is disposed with the in-phase reflection structure, the gain of the millimeter wave signal is large, and the radiation efficiency is high.

Therefore, the antenna radiation patterns of the beams in the plurality of directions also proves that when only the back cover is disposed with the in-phase reflection structure and the distance between the back cover and the circuit board is λ/4, it meets that when the millimeter wave signal sent by the millimeter wave antenna module is reflected a plurality of times between the circuit board and the back cover, the phases of the millimeter wave signal reaching the back cover each time is basically the same.

FIG. 7 to FIG. 9 are also specifically antenna radiation direction diagrams of the millimeter wave signal when the millimeter wave signal is simulated to be transmitted in various cases.

In one embodiment, the in-phase reflection structure A1 is a single-layer structure. When the back cover 120 is disposed with the in-phase reflection structure A1, the in-phase reflection structure A1 is disposed on a surface of the back cover 120 facing the circuit board 300. When the circuit board 300 is disposed with the in-phase reflection structure A1, the in-phase reflection structure A1 is disposed on a surface of the circuit board 300 facing the back cover 120.

FIG. 2 to FIG. 5 shows specific positions when the in-phase reflection structure A1 is the single-layer structure.

Figure 10:
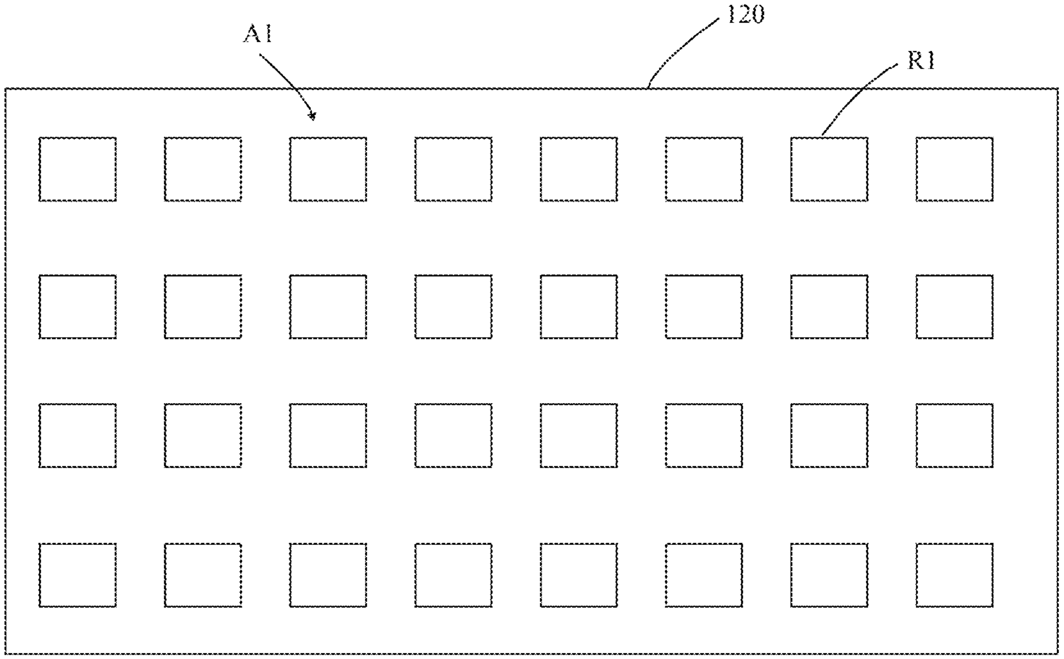
FIG. 10 is a schematic plan view of a back cover that is disposed with an in-phase reflection structure according to an embodiment of this application.

FIG. 10 is a schematic plan view of the back cover 120 that is disposed with the in-phase reflection structure A1 according to an embodiment of this application. FIG. 10 is a schematic diagram viewed from an inner surface side of the back cover 120, that is, a side closed to the circuit board 300. As shown in FIG. 10 and FIG. 2 to FIG. 5, the in-phase reflection structure A1 may include a plurality of reflection units R1 disposed at intervals, and each reflection unit R1 is a single-layer metal structure.

A single-layer metal structure of each reflection unit R1 may constitute a capacitor or an inductor to form an LC parallel resonant circuit, and may implement an in-phase reflection property through the LC parallel resonant circuit. Through analysis, when the LC parallel resonant circuit is formed, a phase of a received millimeter wave signal is the same as that of a phase of a reflected millimeter wave signal, to implement the in-phase reflection property.

A shape of the reflection unit R1 shown in FIG. 10 is only an example and does not represent an actual shape of the reflection unit R1. When the in-phase reflection structure A1 is the single-layer structure, an actual shape of each reflection unit R1 may be set based on a requirement of constituting a capacitance and an inductance to form an LC parallel resonant circuit.

Figure 11:
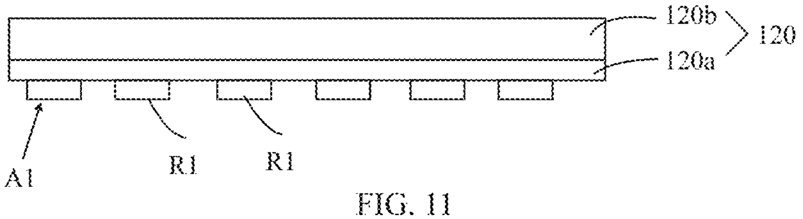
FIG. 11 is a schematic diagram of a structure of a back cover according to an embodiment of this application.

FIG. 11 is a schematic diagram of a structure of the back cover 120 according to an embodiment of this application. As shown in FIG. 11, the back cover 120 includes an inner film layer 120*a* and a back cover body 120*b* that are stacked in sequence. The inner film layer 120*a* has a specific pattern and/or color. The back cover body 120*b* is made of a transparent material. The inner film layer 120*a* is disposed on a surface of the back cover body 120*b* facing the circuit board 300. When the back cover 120 is disposed with the in-phase reflection structure A1, the in-phase reflection structure A1 is disposed on a surface of the inner film layer 120*a* facing the circuit board 300.

The back cover body 120*b* may specifically be made of glass. The pattern and/or color of the inner film layer 120*a* is presented through the back cover body 120*b* and adopted as a pattern and/or color of the back cover 120. When the in-phase reflection structure A1 is the single-layer structure, the back cover body 120*b* may be an outermost layer of the back cover 120.

Each reflection unit R1 may be formed on the inner film layer 120*a* by a pad printing process or a screen-printing silver paste process.

Therefore, in one embodiment, if the in-phase reflection structure A1 is the single-layer structure, only the in-phase reflection structure A1 needs to be disposed on a side of the back cover 120 facing the circuit board 300. Specifically, the in-phase reflection structure A1 needs to be disposed on a side of the inner film layer 120*a* of the back cover 120 facing the circuit board 300. This does not affect an appearance of the back cover 120 and simplifies the process.

When the in-phase reflection structure A1 is the single-layer structure and the back cover 120 is disposed with the in-phase reflection structure, a millimeter wave signal reaching the back cover 120 each time is a millimeter wave signal reaching the reflection unit R1, and a distance between the circuit board 300 and the back cover 120 satisfies that phases of millimeter wave signal reaching the reflection unit R1 each time are the same.

Specifically, when the in-phase reflection structure A1 is the single-layer structure and only the back cover 120 is disposed with the in-phase reflection structure A1, the distance between a circuit board 300 and the back cover 120 is specifically a distance between a circuit board 300 that is not disposed with the in-phase reflection structure A1 and a reflection unit R1 of the back cover 120 that is disposed with the in-phase reflection structure A1. When only the circuit board 300 is disposed with the in-phase reflection structure A1, the distance between the circuit board 300 and the back cover 120 is a distance between the circuit board 300 that is disposed with the in-phase reflection structure A1 and a reflection unit R1 in a back cover 120 that is not disposed with the in-phase reflection structure A1. When the back cover 120 and the circuit board 300 are disposed with the in-phase reflection structure A1, the distance between the circuit board 300 and the back cover 120 is a distance between a reflection unit R1 in the circuit board 300 that is disposed with the in-phase reflection structure A1 and the reflection unit R1 in the back cover 120 that is disposed with the in-phase reflection structure A1.

A spacing between the reflection units R1 is small, and significantly smaller than a size of the reflection unit R1. Therefore, although the in-phase reflection structure A1 includes a plurality of reflection units R1 disposed at intervals, due to the small spacing between the reflection units R1, when at least one of the circuit board 300 and the back cover 120 is disposed with the in-phase reflection structure A1, a millimeter wave signal reflected between the circuit board 300 and the back cover 120 may be transmitted to a reflection unit R1 of the in-phase reflection structure A1 and reflected by the reflection unit R1.

Figure 12A:
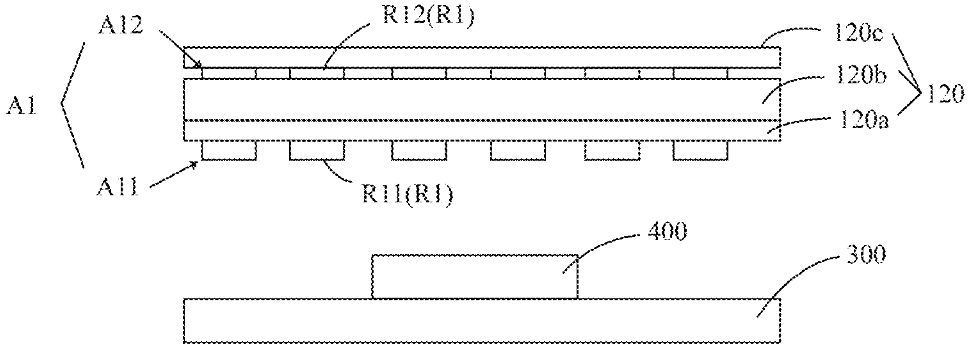
FIGS. 12A and 12B are schematic diagrams of a structure of a back cover and circuit board according to another embodiment of this application.
Figure 12B:
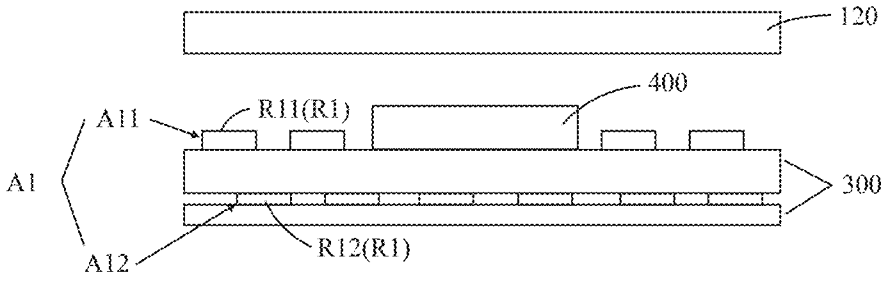
Figure 13:
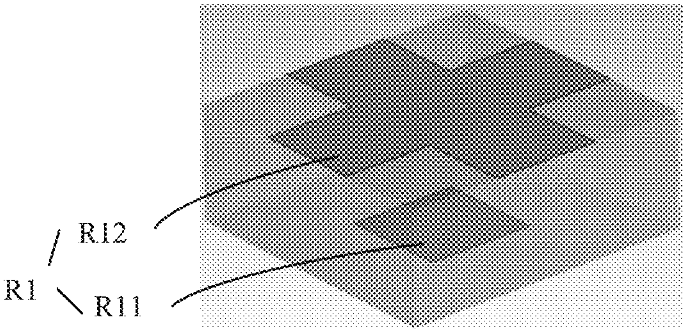
FIG. 13 is a schematic diagram of a reflection unit according to another embodiment of this application.

Refer to FIGS. 12A, 12B, and FIG. 13. FIG. 12A is a schematic diagram of a structure of the back cover 120 and circuit board 300 according to another embodiment of this application. FIG. 12B is a schematic diagram of a structure of the back cover 120 and circuit board 300 according to another embodiment of this application. FIG. 13 is a schematic diagram of a reflection unit R1 according to another embodiment of this application In the other embodiment, the in-phase reflection structure A1 is the double-layer structure, including a first structure layer A11 and a second structure layer A12. As shown in FIG. 12A, when the back cover 120 is disposed with the in-phase reflection structure A1, a first structure layer A11 of the in-phase reflection structure A1 is disposed on a surface of the back cover 120 facing the circuit board 300, and a second structure layer A12 is disposed in the back cover 120. FIG. 12A shows only a schematic diagram in which the in-phase reflection structure A1 is disposed in the back cover 120. As shown in FIG. 12B, when the circuit board 300 is disposed with the in-phase reflection structure A1, the first structure layer A11 of the in-phase reflection structure A1 is disposed on a surface of the circuit board 300 facing the back cover 120, and the second structure layer A12 is disposed on a certain layer of the circuit board 300 or on a surface of the circuit board 300 facing away from the back cover 120.

As shown in FIGS. 12A, 12B, and FIG. 13, the in-phase reflection structure A1 includes a plurality of reflection units R1 disposed at intervals. Each reflection unit R1 includes a first reflection structure R11 and a second reflection structure R12. First reflection structures R11 of all the reflection units R1 form the first structure layer A11, and the second reflection structures R12 of all the reflection units R1 form the second structure layer A12. The plurality of reflection units R1 disposed at intervals are disposed at intervals along a plane perpendicular to a thickness direction of the back cover 120. Each reflection unit R1 includes a first reflection structure R11 and a second reflection structure R12 that are disposed at intervals in the thickness direction of the back cover 120.

When the in-phase reflection structure A1 is the double-layer structure, and the back cover is disposed with the in-phase reflection structure, the millimeter wave signal reaching the back cover 120 each time is a millimeter wave signal reaching the first reflection structure R11/first structure layer A11, and the distance between the circuit board 300 and the back cover 120 satisfies that phases of the millimeter wave signal reaching the first reflection structure/first structure layer A11 each time are the same.

Specifically, when the in-phase reflection structure A1 is the double-layer structure and only the back cover 120 is disposed with the in-phase reflection structure A1, the distance between the circuit board 300 and the back cover 120 is specifically a distance between the circuit board 300 that is not disposed with the in-phase reflection structure A1 and a first reflection structure R11/first structure layer A11 of the back cover 120 that is disposed with the in-phase reflection structure A1. When only the circuit board 300 is disposed with the in-phase reflection structure A1, the distance between the circuit board 300 and the back cover 120 is a distance between a first reflection structure R11/first structure layer A11 in the circuit board 300 that is disposed with the in-phase reflection structure A1 and the back cover 120 that is not disposed with the in-phase reflection structure A1. When the back cover 120 and the circuit board 300 are disposed with the in-phase reflection structure A1, the distance between the circuit board 300 and the back cover 120 is a distance between the first reflection structure R11/first structure layer A11 in the circuit board 300 that is disposed with the in-phase reflection structure A1 and a first reflection structure R11/first structure layer A11 in the back cover 120 that is disposed with the in-phase reflection structure A1.

As shown in FIG. 13, a first reflection structure R11 and a second reflection structure R12 of each reflection unit R1 are correspondingly disposed in the thickness direction of the back cover.

As shown in FIG. 13, the first reflection structure R11 is a square metal sheet, and the second reflection structure R12 is a cross metal sheet. In some embodiments of this application, the first reflection structure R11 is specifically a square metal sheet. In other embodiments, the first reflection structure R11 may also be a rectangular metal sheet.

That the first reflection structure R11 and the second reflection structure R12 of each reflection unit R1 are correspondingly disposed in the thickness direction of the back cover may mean that a projection of the first reflection structure R11 of each reflection unit R1 coincides with a projection of a geometric center of the second reflection structure R12 in the thickness direction of the back cover. Because the first reflection structure R11 is configured as a square metal sheet, the second reflection structure R12 is configured as a cross metal sheet, and the projection of the square metal sheet of each reflection unit R1 coincides with the projection of the geometric center of the cross metal sheet in the thickness direction of the back cover 120, in-phase reflection precision may be effectively improved.

As shown in FIG. 13, in some examples, a size of the first reflection structure R11 that is a square metal sheet may be smaller than a size of the second reflection structure R12 that is a cross metal sheet.

In another embodiment, by setting the in-phase reflection structure A1 as the double-layer structure, because the double-layer structure is more conducive to implement in-phase reflection of the millimeter wave signal, the in-phase reflection property of the in-phase reflection structure A1 may be effectively improved.

As shown in FIG. 12A, when the in-phase reflection structure A1 is the double-layer structure, the back cover 120 includes an inner film layer 120 *a*, a back cover body 120 *b*, and an outer film layer 120 *c* that are stacked in sequence. The inner film layer 120 *a* is disposed on the surface of the back cover body 120 *b* facing the circuit board 300, and the outer film layer 120 *c* is disposed on a surface of the back cover body 120 *b* facing away from the circuit board 300. When the back cover 120 is disposed with the in-phase reflection structure A1, the first structure layer A11 of the in-phase reflection structure A1 is disposed on the surface of the inner film layer 120 *a* facing the circuit board 300, and the second structure layer A12 is disposed between the back cover body 120 *b* and the outer film layer 120 *c*.

The inner film layer 120*a* has a specific pattern and/or color. The back cover body 120*b* is made of a glass material, and the outer film layer 120*c* is made of a transparent material. The outer film layer 120*c* is configured to protect the second structure layer A12. The pattern and/or color of the inner film layer 120*a* is presented through the back cover body 120*b* and the outer film layer 120*c*, and adopted as the pattern and/or color of the back cover 120.

When the in-phase reflection structure A1 is the double-layer structure, the back cover 120 may further include an outer film layer 120*c*, to protect the in-phase reflection structure A1 as a whole. In some embodiments, the outer film layer 120*c* may also have a pattern and/or color, and cooperate with the inner film layer 120*a* to present an overall pattern and/or color, and cover the in-phase reflection structure A1.

The outer film layer 120*c* may be made of transparent resin, transparent plastic, and the like.

The second structure layer A12 is disposed between the back cover body 120*b* and the outer film layer 120*c* in a plurality of manners. In an implementation, the second structure layer A12 may first be formed on a surface of the outer film layer 120*c*, and a surface of the outer film layer 120*c* that is disposed with the second structure layer A12 and on which the second structure layer A12 is disposed faces a surface of the back cover body 120*b* facing away from the inner film layer 120*a* and is adhered to the surface of the back cover body 120*b* facing away from the inner film layer 120*a* by bonding or the like. In the second manner, the surface of the back cover body 120*b* facing away from the inner film layer 120*a* is etched to form an accommodating groove corresponding to the second structure layer A12, a metal wire or the like is embedded in the accommodating groove to form the second structure layer A12, and then the outer film layer 120*c* is covered on the surface of the back cover body 120*b* facing away from the inner film layer 120*a*.

In some embodiments, for example, in the foregoing first implementation, the outer film layer 120*c* may include a transparent film layer and a coating film layer that is disposed on a surface of the transparent film layer facing away from the back cover body 120*b*. The second structure layer A12 is formed on a surface of the transparent film layer opposite to the coating film layer. The coating film layer has a specific pattern and/or color, and cooperated with the inner film layer 120*a* to present an overall pattern and/or color, and cover the in-phase reflection structure A1. In other embodiments, for example, in the foregoing second implementation, the outer film layer 120*c* may be only a coating film layer and may be directly covered on the surface of the back cover body 120*b* facing away from the inner film layer 120*a* by a process such as coating.

Figure 14:
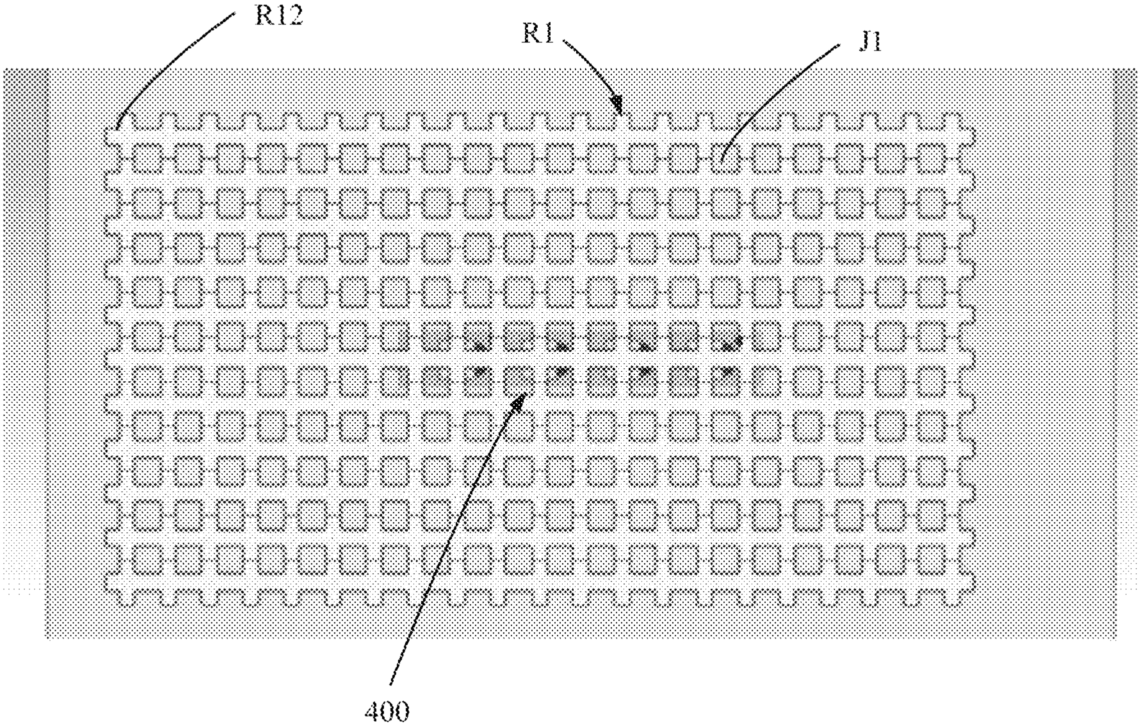
FIG. 14 is a schematic plan view of a back cover that is disposed with an in-phase reflection structure according to another embodiment of this application.

FIG. 14 is a schematic plan view of an in-phase reflection structure A1 when the back cover 120 is disposed with the in-phase reflection structure A1 according to another embodiment of this application. FIG. 14 is a schematic diagram viewed from an outer surface side of the back cover 120, that is, a side facing away from the circuit board 300. As shown in FIG. 14, the in-phase reflection structure A1 includes a plurality of reflection units R1 disposed at intervals, and the reflection units are distributed in a matrix on the back cover 120. Because the size of a first reflection structure R1 that is a square metal sheet is smaller than the size of the second reflection structure R12 that is a cross metal sheet, and the first reflection structure R11 of the square metal sheet is disposed on a side of the inner film layer 120*a* facing the circuit board 300, only the second reflection structure R12 that is a cross metal sheet may be seen when FIG. 14 is viewed from the outer surface side of the back cover 120.

As seen from FIG. 14, a spacing between second reflection structures R12 is small. In some embodiments, adjacent second reflection structures R12 may be connected to each other, to form an overall second structure layer A12, and facilitates manufacturing and formation in the back cover 120. Because the first reflection structure R11 is smaller than the second reflection structure R12, the first reflection structures R11 of the plurality of reflection units R1 are disposed at intervals.

Specifically, as shown in FIG. 14, because the second reflection structure R12 is a cross metal sheet, the adjacent second reflection structures R12 are connected to each other by four protruding parts of the cross metal sheet, and a spacing J1 is formed between the cross metal sheets through the four protruding parts, so that the inner film layer 120*a* may present a corresponding pattern and/or color, and reflection effect may be ensured.

FIG. 14 also shows a position of the millimeter wave antenna module 400. It can be seen from FIG. 14 that a projection of the millimeter wave antenna module 400 on the in-phase reflection structure A1 is approximately located in a middle of the in-phase reflection structure A1.

FIG. 12 to FIG. 14 uses an example in which the in-phase reflection structure A1 is disposed in the back cover 120. As described previously, when the in-phase reflection structure A1 is a double-layer structure and the circuit board 300 is disposed with the in-phase reflection structure A1, the first structure layer A11 of the in-phase reflection structure A1 is disposed on the surface of the circuit board 300 facing the back cover 120, and the second structure layer A12 is disposed on the certain layer of the circuit board 300 or on the surface of the circuit board 300 facing away from the back cover 120. When the circuit board 300 is disposed with the in-phase reflection structure A1, an area of the circuit board 300 that is correspondingly provided with the in-phase reflection structure A1 is a clearance area for removing a circuit and a copper foil, and the like, so that transmission of the millimeter wave signal is not blocked and interfered.

A structure of the in-phase reflection structure A1 that is disposed in the circuit board 300 is the same as that of the in-phase reflection structure A1 that is disposed in the back cover 120, and more details are described herein.

The first structure layer A11 and the second structure layer A12 constitute the LC parallel resonant circuit. As described previously, when the LC parallel resonant circuit is formed, and the millimeter wave signal is presented, the phase of the received millimeter wave signal is the same as that of the reflected millimeter wave signal, to implement the in-phase reflection property. Specifically, when the back cover 120 or the circuit board 300 is disposed with the in-phase reflection structure A1, the millimeter wave signal reaching the back cover 120 or the circuit board is first transmitted to the first structure layer A11, to constitute the LC parallel resonant circuit through the first structure layer A11 and the second structure layer A12 for reflection. This may ensure that a phase of a millimeter wave signal transmitted inside any first structure layer A1 is the same as that of a millimeter wave signal transmitted outside the first structure layer A11, to implement the in-phase reflection property.

In this embodiment of this application, when the back cover 120 or the circuit board 300 is disposed with the in-phase reflection structure A1 the in-phase reflection structure A1 may be disposed on an entire area of a corresponding surface of the back cover 120 or the circuit board 300, or only on a partial area of the corresponding surface of the back cover 120 or the circuit board 300. The partial area of the corresponding surface of the back cover 120 or the circuit board 3M) on which the in-phase reflection structure A1 is disposed may be a target area in which the millimeter wave antenna module 400 radiates towards periphery by a preset radiation range from a projection area on the back cover 120 or the circuit board 300 as a center. After the millimeter wave signal is reflected a plurality of times between the back cover 120 and the circuit board 300, energy is gradually attenuated. The most edge position of the target area may be a position at which reflected energy of the millimeter wave signal is small and may be negligible, for example, 1/100 of original energy. Alternatively, the partial area of the corresponding surface of the back cover 120 or the circuit board 300 on which the in-phase reflection structure A1 is disposed may be a target area in which the millimeter wave antenna module 400 radiates beams of the millimeter wave signal to a preset radiation range from a projection area on the back cover 120 as a center. In this case, the partial area of the corresponding surface of the back cover 120 or the circuit board 300 on which the in-phase reflection structure A1 is disposed may be an area corresponding to the target area. The projection range of a beam of the millimeter wave signal sent by the millimeter wave antenna module 400 on the back cover 120 refers to a projection range of a scanning beam of the millimeter wave signal that scans in a range of plus or minus 45° and that is on the back cover 120.

In some embodiments, when the back cover 120 and the circuit board 300 are disposed with the in-phase reflection structure A1, the in-phase reflection structure A1 that is disposed on the back cover 120 may be the same as or different from the in-phase reflection structure A1 that is disposed on the circuit board 300. For example, the in-phase reflection structure A1 that is disposed on the back cover 120 and the in-phase reflection structure A1 that is disposed on the circuit board 300 may both be the foregoing single-layer structure or double-layer structure. Alternatively, the in-phase reflection structure A1 that is disposed on the back cover 120 is the single-layer structure, and the in-phase reflection structure A1 that is disposed on the circuit board 300 is the double-layer structure. Alternatively, the in-phase reflection structure A1 that is disposed on the back cover 120 is the double-layer structure, and the in-phase reflection structure A1 that is disposed on the circuit board 30) is the single-layer structure.

Therefore, the back cover 120 and the circuit board 300 may select the in-phase reflection structure A1 that is the single-layer structure or the in-phase reflection structure A1 that is the double-layer structure based on respective structures, to batter adapt to their own configurations and meet requirements for overall layout.

As described previously, because the spacing between the reflection units R1 of the in-phase reflection structure A1 is small, when the at least one of the circuit board 300 and the back cover 120 is disposed with the in-phase reflection structure A1, the millimeter wave signal that is reflected between the circuit board 300 and the back cover 120 may be transmitted to the reflection unit R1 of the in-phase reflection structure A1. Either a reflection unit R1 in the in-phase reflection structure A1 that is the single-layer structure or a reflection unit R1 in the in-phase reflection structure A1 that is the double-layer structure, because there is a certain distance between the foregoing structure and the reflection unit R1, a surface wave may not be formed when the millimeter wave signal propagates along a surface of the circuit board 300 or the back cover 120. Thus, as discussed previously, the in-phase reflection structure A1 of this application may also reduce or even eliminate the surface wave formed on the back cover 120 and/or the circuit board 300 that is disposed with the in-phase reflection structure A1, to avoid an energy loss due to the formed surface wave.

As shown in FIG. 5, when the back cover 120 and the circuit board 300 are disposed with the in-phase reflection structure A1, because the circuit board 300 is also disposed with the millimeter wave antenna module 400, an area that is on the circuit board 300 and on which the in-phase reflection structure A1 is disposed may be smaller than an area that is on the back cover 120 and on which the in-phase reflection structure A1 is disposed. For example, the area that is on the circuit board 300 and on which the in-phase reflection structure A1 is disposed may correspondingly be an area obtained by the area that is on the back cover 120 and on which the in-phase reflection structure A1 is disposed subtracting an area corresponding to the millimeter wave antenna module 400.

Figure 15:
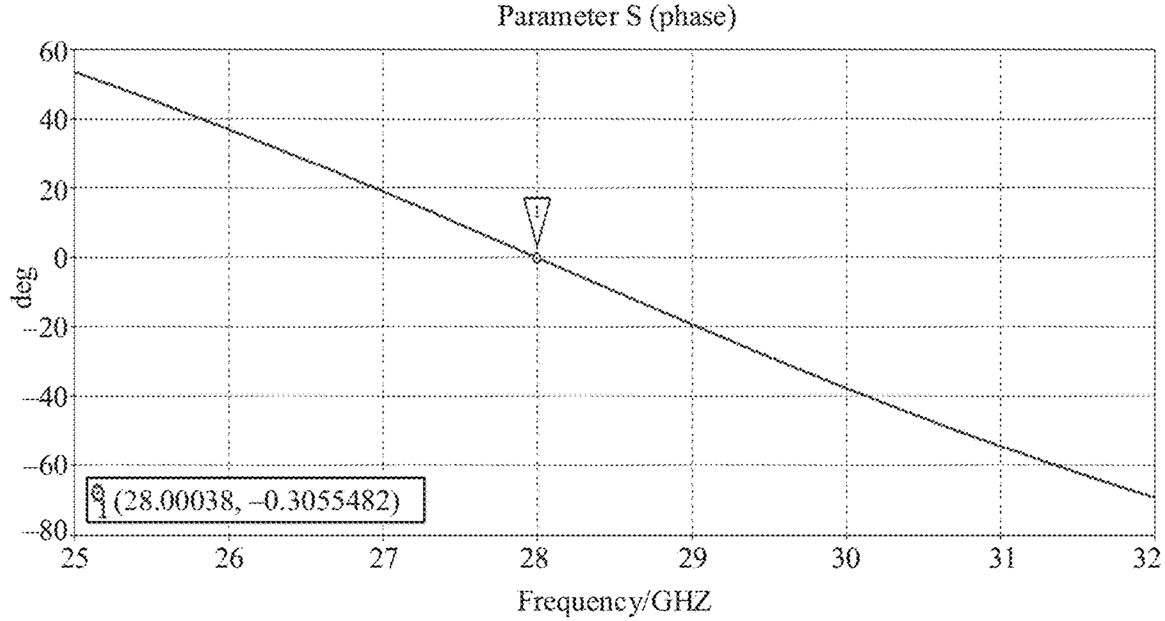
FIG. 15 is a schematic diagram of a reflection phase obtained when a millimeter wave signal is simulated to pass through a back cover that is disposed with an in-phase reflection structure according to an embodiment of this application.
Figure 16:
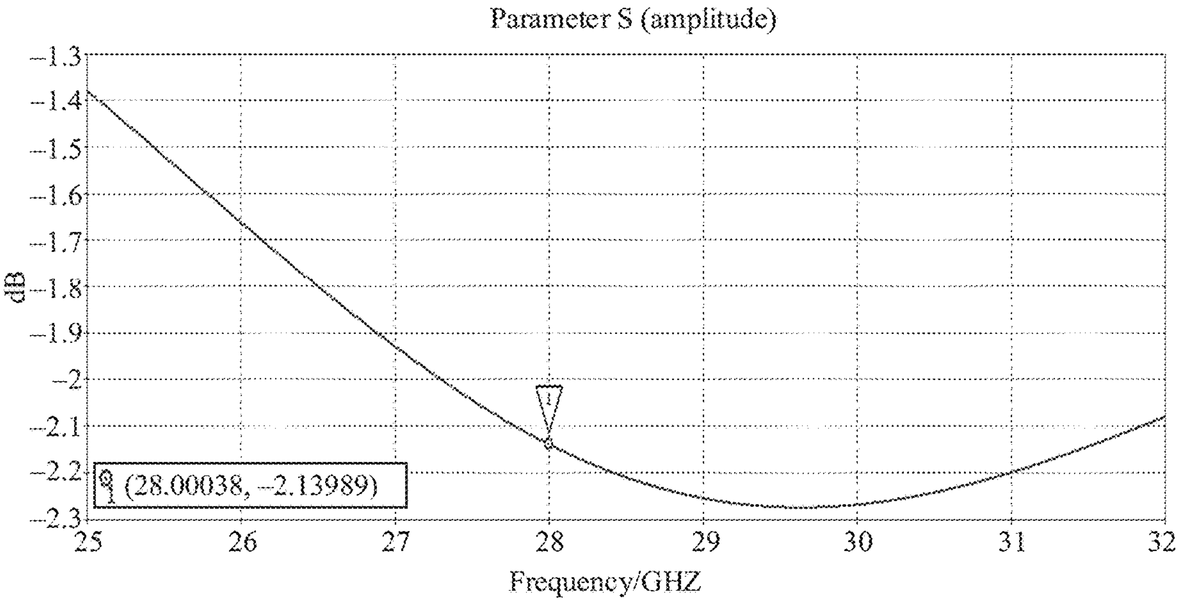
FIG. 16 is a schematic diagram of a reflection amplitude obtained when a millimeter wave signal is simulated to pass through a back cover that is disposed with an in-phase reflection structure according to an embodiment of this application.

Refer to FIG. 15 and FIG. 16. FIG. 15 is a schematic diagram of a reflection phase obtained when a millimeter wave signal is simulated to pass through a back cover that is disposed with an in-phase reflection structure. FIG. 16 is a schematic diagram of a reflection amplitude obtained when a millimeter wave signal is simulated to pass through a back cover that is disposed with an in-phase reflection structure, that is, a schematic diagram of a return loss/reflection coefficient.

As shown in FIG. 15 and FIG. 16, a millimeter wave signal with frequency of 28 GHz is used as a test signal. A back cover 120 made of glass back cover and the foregoing in-phase reflection structure A1 that is the double-layer structure, for example, are used in a simulation test.

It can be seen from FIG. 15 that, when the 28 GHz millimeter wave signal is reflected, a phase of the back cover 120 that is disposed with the in-phase reflection structure A1 is equal to 0. Therefore, it can be seen from the simulation test that the back cover 120 that is disposed with the in-phase reflection structure A1 may implement the in-phase reflection property.

It can be seen from FIG. 16 that, a reflection amplitude of the back cover 120 that is with the in-phase reflection structure is still large, that is, a return loss/reflection coefficient is still large, approximately about −2.15 dB. Therefore, a large amount of millimeter wave signals are reflected, and a small amount of millimeter wave signals are transmitted. According to the solutions in this application, when the millimeter wave signal sent by the millimeter wave antenna module is reflected a plurality of times between the circuit board and the back cover, phases of the millimeter wave signal reaching the back cover each time are basically the same, that is, phases of a millimeter wave signal transmitted each time are the same. Therefore, all transmitted millimeter wave signals are gained each other because of the same phases. Finally, an overall return loss is low, and full transmission effect may be basically achieved.

It should be noted that FIG. 16 is only a schematic diagram of a return loss when the millimeter wave signal is simulated to be reflected once by the back cover 120, and a distance factor is not considered. As described previously, FIG. 6 is a schematic diagram of an overall return loss obtained when the millimeter wave signal is simulated to be transmitted in various cases, for example, a schematic diagram of the overall return loss obtained when the millimeter wave signal is transmitted by the back cover 120 that is disposed with the in-phase reflection structure A1. Therefore, although the return loss/reflection coefficient of the millimeter wave signal reflected once by the back cover 120 is high, the phases of the millimeter wave signal reaching the back cover each time are basically the same, that is, the phases of the millimeter wave signals transmitted each time are the same. Therefore, all the transmitted millimeter wave signals are gained each other because of the same phases. Finally, the overall return loss is low.

In this embodiment of this application, no matter the in-phase reflection structure A1 that is the single-layer structure or the double-layer structure, the plurality of reflection units R1 included in the in-phase reflection structure A1 may be disposed in the matrix as described previously, may be disposed in a plurality of ring arrays that have different radii and that are centered on the millimeter wave antenna module 400, or may be disposed in other ways. The beams of the millimeter wave signal may be disposed in rows and columns along a scanning direction in a projection range on the back cover 120.

Figure 17:
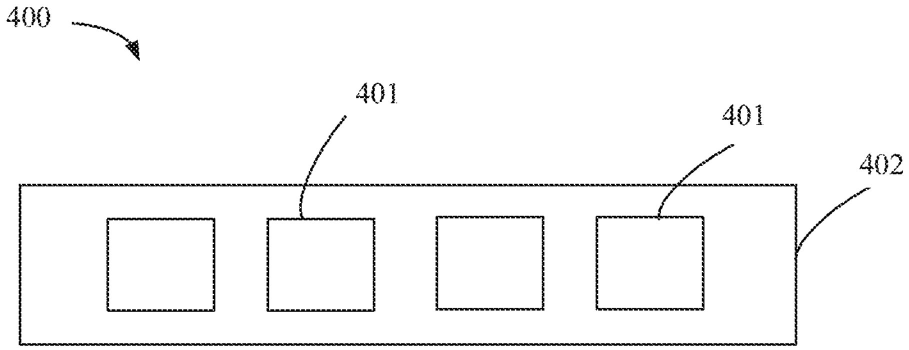
FIG. 17 is a schematic plan view of a millimeter wave antenna module according to an embodiment of this application.
Figure 18:
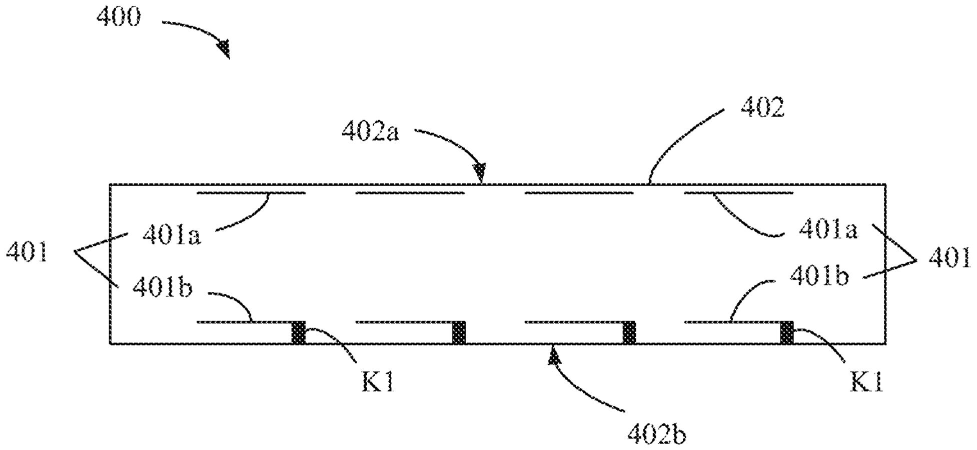
FIG. 18 is a schematic cross-sectional view of a millimeter wave antenna module according to an embodiment of this application.

Refer to FIG. 17 and FIG. 18. FIG. 17 is a schematic plan view of a millimeter wave antenna module 400 according to an embodiment of this application. FIG. 18 is a schematic cross-sectional view of a millimeter wave antenna module 400 according to an embodiment of this application.

In an embodiment, the millimeter wave antenna module 400 includes a plurality of antennas 401. The plurality of antennas 401 form an antenna array. A projection range of a millimeter wave signal beam sent by the millimeter wave antenna module 400 on the back cover 120 refers to a projection range of beams of millimeter wave signals sent by the plurality of antennas on the back cover 120. The projection of the millimeter wave antenna module 400 on the back cover 120 refers to projections of the plurality of antennas on the back cover 120. The antenna 401 is a millimeter wave antenna, and the antenna array including a plurality of antennas 401 is a millimeter wave antenna array.

As shown in FIG. 17 and FIG. 18, the millimeter wave antenna module 400 further includes an antenna substrate 402. The plurality of antennas 401 are disposed on the antenna substrate 402 in a row at intervals. The antenna substrate 402 is an insulating medium substrate.

As shown in FIG. 18, the antenna substrate 402 includes a first surface 402*a* and a second surface 402*b*. When the millimeter wave antenna module 400 is disposed on a circuit board 300, the first surface 402*a* is a surface facing the back cover 120, and the second surface 402*b* is a surface facing away from the back cover 120. Each antenna 401 includes an upper metal sheet 401*a* and a lower metal sheet 401*b*. The upper metal sheet 401*a* and the lower metal sheet 401*b* are disposed at intervals, and a projection of the upper metal sheet 401*a* substantially coincides with a projection of the lower metal sheet 401*b* in a direction from the first surface 402*a* to the second surface 402*b*. As shown in FIG. 15 the upper metal sheet 401*a* is disposed at a position that is in the antenna substrate 402 and that is close to the first surface 402*a*, and the lower metal sheet 401*b* is disposed at a position that is in the antenna substrate 402 and that is close to the second surface 402*b*. The upper metal sheet 401*a* and the lower metal sheet 401*b* are in a patch shape and substantially disposed in parallel to the first surface 402*a* and the second surface 402*b* in the antenna substrate 402, that is, substantially parallel to an inner surface of a back cover 120 or a surface of the circuit board 300.

The lower metal sheet 401*b* is disposed with a feed point KI. The lower metal sheet 401*b* is connected to a feed source (not shown) through the feed point KI, and the lower metal sheet 401*b* is spatially coupled with the upper metal sheet 401*a*, to transmit a feed signal to the upper metal sheet 401 a, then generate a millimeter wave signal through the upper metal sheet 401*a* and the lower metal sheet 401*b*, and radiate the millimeter wave signal toward the back cover 120 through the upper metal sheet 401*a*.

Because structures of antennas 401 are the same, only one antenna 401 is used as an example for description.

Each antenna 401 constitutes a patch antenna by using the upper metal sheet 401 a and the lower metal sheet 401*b*, and is formed on the antenna substrate 402 by a laser process or the like. Alternatively, each antenna 401 may be a flexible printed circuit (FPC, flexible printed circuit) antenna that is disposed on the antenna substrate 402. The FPC antenna refers to a metal antenna pattern formed on the FPC. The FPC antenna may be fastened on the antenna substrate 402 by bonding, embedding, welding, or the like.

The millimeter wave antenna module 400 may be carried on a surface of the circuit board 300 facing the back cover 120. Alternatively, a groove that penetrates or does not penetrate the circuit board 300 may be disposed on the surface of the circuit board 300 facing the back cover 120, and the millimeter wave antenna module 400 is accommodated in the groove, to reduce a thickness of the whole electronic device.

A structure of the millimeter wave antenna module 400 may be a structure of the millimeter wave antenna module 400 included in the electronic device 1000 or a structure of the millimeter wave antenna module used in the foregoing simulation.

In other embodiments, the millimeter wave antenna module 400 may also be of another structure. For example, the millimeter wave antenna module includes only one or more antennas 401 and does not include an antenna substrate 402, and a structure of the antenna 401 is different from the foregoing structure, for example, may be a planner invented F antenna (PIFA, Planner Invented F antenna), and the antenna 401 is directly formed on the circuit board 300.

In this application, although the back cover 120 reflects the millimeter wave signal, by setting a preset distance between the circuit board 300 and the back cover 120, when the millimeter wave signal sent by the millimeter wave antenna module 400 is reflected a plurality of times between the circuit board 300 and the back cover 120, the phases of the millimeter wave signal reaching the back cover 120 each time are the same. Because the millimeter wave signal reaching the back cover 120 is partially transmitted each time, and phases of the transmitted millimeter wave signal are equal to the phases of the millimeter wave signal reaching the back cover 120, the phases of the millimeter wave signal transmitted each time are the same, and millimeter wave signals with same phases are reinforced and gained each other. Therefore, a final overall return loss is low, so that much of electromagnetic wave energy flows across the back cover, and high gain effect is obtained. In comparison with a case that the in-phase reflection structure A1 is not disposed, in this application, the at least one of the back cover 120 and the circuit board 300 is disposed with the in-phase reflection structure A1, so that the phases of the millimeter wave signal reaching the back cover 120 each time are the same when the millimeter wave signal sent by the millimeter wave antenna module 400 is reflected a plurality of times between the circuit board 300 and the back cover 120 in a shorter distance. This reduces a thickness of the whole electronic device and improves radiation performance of the antenna.

The foregoing descriptions are merely specific implementations of this application, but the protection scope of this application is not limited thereto. Any person skilled in the art can easily conceive modifications or replacements within the technical scope of this application, and these modifications or replacements shall fall within the protection scope of this application. Embodiments of this application and features in embodiments may be combined with each other, disposed that no conflict occurs. Therefore, the protection scope of this application shall be subject to the protection scope of the claims.

What is claimed is:

1. An electronic device, comprising:

a circuit board;

a housing configured to enclose the circuit board, the housing comprising a back cover, wherein at least one of the back cover or the circuit board is disposed with an in-phase reflection structure, and wherein the in-phase reflection structure includes multiple layers; and a millimeter wave antenna module disposed on a surface of the circuit board facing the back cover and configured to send a millimeter wave signal, wherein the millimeter wave signal sent by the millimeter wave antenna module is reflected a plurality of times between the circuit board and the back cover, wherein the in-phase reflection structure is configured to reflect a received millimeter wave signal, wherein a phase of a millimeter wave signal received by the in-phase reflection structure is the same as that of the reflected millimeter wave signal, and wherein a distance between the circuit board and the back cover is $d=n*\lambda/2-(\Delta\varphi 1+\Delta\varphi 2)*\lambda/4\pi$, wherein $\Delta\varphi 1$ represents a first variation phase varied after the millimeter wave signal is reflected by the back cover, wherein $\Delta\varphi 2$ represents a second variation phase varied after the millimeter wave signal is reflected by the circuit board, wherein $\lambda$ represents a wavelength of the millimeter wave signal, and wherein n is 0 or a positive integer.

2. The electronic device of claim 1, wherein when the back cover or the circuit board is disposed with the in-phase reflection structure, the back cover or the circuit board that is disposed with the in-phase reflection structure reflects the received millimeter wave signal, and the phase of the received millimeter wave signal is the same as that of the reflected millimeter wave signal, and wherein when the back cover is not disposed with the in-phase reflection structure, the back cover that is not disposed with the in-phase reflection structure reflects the received millimeter wave signal, and a difference between phases of the reflected millimeter wave signal and the received millimeter wave signal is $-\pi$.

3. The electronic device of claim 1, wherein the in-phase reflection structure comprises a first structure layer and a second structure layer, wherein when the back cover is disposed with the in-phase reflection structure, the first structure layer is disposed on a surface of the back cover facing the circuit board, and the second structure layer is disposed in the back cover, and wherein when the circuit board is disposed with the in-phase reflection structure, the first structure layer is disposed on the surface of the circuit board facing the back cover, and the second structure layer is disposed on a layer of the circuit board or on a surface of the circuit board facing away from the back cover.

4. The electronic device of claim 3, wherein the in-phase reflection structure comprises a plurality of reflection units disposed at intervals, each reflection unit comprises a first reflection structure and a second reflection structure, first reflection structures of all the reflection units form the first structure layer, and second reflection structures of all the reflection units form the second structure layer.

5. The electronic device of claim 4, wherein when the back cover is disposed with the in-phase reflection structure, the millimeter wave signal reaching the back cover each time is a millimeter wave signal reaching the first reflection structure, and the distance between the circuit board and the back cover is such that phases of the millimeter wave signal reaching the first reflection structure each time are the same.

6. The electronic device of claim 4, wherein the first reflection structure and the second reflection structure of each reflection unit are correspondingly disposed in a thickness direction of the back cover.

7. The electronic device of claim 6, wherein the first reflection structure is a square metal sheet, and the second reflection structure is a cross metal sheet.

8. The electronic device of claim 7, wherein a projection of a square metal sheet of each reflection unit coincides with a projection of a geometric center of the cross metal sheet in the thickness direction of the back cover.

9. The electronic device of claim 3, wherein the back cover comprises:

an inner film layer disposed on a surface of the back cover body facing the circuit board;

a back cover body; and an outer film layer disposed on a surface of the back cover body facing away from the circuit board, wherein the inner film layer, the back cover body, and the outer film layer are stacked in sequence, and wherein when the back cover is disposed with the in-phase reflection structure, the first structure layer is disposed on a surface of the inner film layer facing the circuit board, and the second structure layer is disposed between the back cover body and the outer film layer.

10. The electronic device of claim 9, wherein the inner film layer has a specific pattern or color, the back cover body is made of a glass material, the outer film layer is made of a transparent material, the outer film layer is configured to protect the second structure layer, and the pattern and/or color of the inner film layer is presented through the back cover body and the outer film layer as a pattern and/or color of the back cover.

11. An electronic device, comprising:

a circuit board;

a housing configured to enclose the circuit board, the housing comprising a back cover disposed with an in-phase reflection structure that comprises a first structure layer and a second structure layer, wherein when the back cover is disposed with the in-phase reflection structure, the first structure layer is disposed on a surface of the back cover facing the circuit board and the second structure layer is disposed in the back cover, and wherein when the circuit board is disposed with the in-phase reflection structure, the first structure layer is disposed on the surface of the circuit board facing the back cover and the second structure layer is disposed on a layer of the circuit board or on a surface of the circuit board facing away from the back cover; and a millimeter wave antenna module disposed on a surface of the circuit board facing the back cover and configured to send a millimeter wave signal, wherein the millimeter wave signal sent by the millimeter wave antenna module is reflected a plurality of times between the circuit board and the back cover, wherein the in-phase reflection structure is configured to reflect a received millimeter wave signal, wherein a phase of a millimeter wave signal received by the in-phase reflection structure is the same as that of the reflected millimeter wave signal, and wherein a distance between the circuit board and the back cover is such that phases of a millimeter wave signal reaching the back cover each time are the same.

12. The electronic device of claim 11, wherein the distance between the circuit board and the back cover is $d=n*\lambda/2-(\Delta\varphi1+\Delta\varphi2)*\lambda/4\pi$, wherein $\Delta\varphi1$ represents a first variation phase varied after the millimeter wave signal is reflected by the back cover, wherein $\Delta\varphi2$ represents a second variation phase varied after the millimeter wave signal is reflected by the circuit board, wherein $\lambda$ represents a wavelength of the millimeter wave signal, and wherein n is 0 or a positive integer.

13. The electronic device of claim 12, wherein when only the circuit board is disposed with the in-phase reflection structure, the distance between the circuit board and the back cover is a distance between the circuit board that is disposed with the in-phase reflection structure and the back cover that is not disposed with the in-phase reflection structure, and the distance is obtained based on a first variation phase after the millimeter wave signal is reflected by the back cover that is not disposed with the in-phase reflection structure, a second variation phase after the millimeter wave signal is reflected by the circuit board that is disposed with the in-phase reflection structure, and the wavelength of the millimeter wave signal, and wherein when both the back cover and the circuit board each are disposed with the in-phase reflection structure, the distance between the circuit board and the back cover is a distance between the circuit board that is disposed with the in-phase reflection structure and the back cover that is disposed with the in-phase reflection structure, and the distance is obtained based on a first variation phase after the millimeter wave signal is reflected by the back cover that is disposed with the in-phase reflection structure, a second variation phase after the millimeter wave signal is reflected by the circuit board that is disposed with the in-phase reflection structure, and the wavelength of the millimeter wave signal.

14. The electronic device of claim 13, wherein when only the circuit board is disposed with the in-phase reflection structure, $\Delta\varphi1=-\pi$, $\Delta\varphi2=0$, and the distance between the circuit board and the back cover is the distance between the circuit board that is disposed with the in-phase reflection structure and the back cover and is equal to $\lambda/4+n*\lambda/2$.

15. The electronic device of claim 13, wherein when both the circuit board and the back cover each are disposed with the in-phase reflection structure, $\Delta\varphi1=0$, $\Delta\varphi2=0$, and the distance between the circuit board and the back cover is the distance between the circuit board that is disposed with the in-phase reflection structure and the back cover that is disposed with the in-phase reflection structure and is equal to $n*\lambda/2$.

16. The electronic device of claim 11, wherein the back cover reflects the received millimeter wave signal, and the phase of the received millimeter wave signal is the same as that of the reflected millimeter wave signal.

17. The electronic device of claim 11, wherein the in-phase reflection structure comprises a first structure layer and a second structure layer, wherein the first structure layer is disposed on a surface of the back cover facing the circuit board, and the second structure layer is disposed in the back cover.

18. The electronic device of claim 17 wherein the in-phase reflection structure comprises a plurality of reflection units disposed at intervals, each reflection unit comprises a first reflection structure and a second reflection structure, first reflection structures of all the reflection units form the first structure layer, and second reflection structures of all the reflection units form the second structure layer.

19. The electronic device of claim 18, wherein the millimeter wave signal reaching the back cover each time is a millimeter wave signal reaching the first reflection structure, and the distance between the circuit board and the back cover is such that phases of the millimeter wave signal reaching the first reflection structure each time are the same.

* * * * *